United States Patent
Roach et al.

(10) Patent No.: US 11,406,880 B1
(45) Date of Patent: Aug. 9, 2022

(54) SYSTEMS AND METHODS FOR A VARIABLE THICKNESS CLUB HEAD

(71) Applicant: Cobra Golf Incorporated, Carlsbad, CA (US)

(72) Inventors: Ryan L. Roach, Encinitas, CA (US); D. Clayton Evans, San Marcos, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 5 days.

(21) Appl. No.: 17/063,275

(22) Filed: Oct. 5, 2020

(51) Int. Cl.
| | |
|---|---|
| *A63B 53/04* | (2015.01) |
| *B29C 70/34* | (2006.01) |
| *B29C 43/00* | (2006.01) |
| *B29K 63/00* | (2006.01) |
| *B29L 31/52* | (2006.01) |
| *B29K 307/04* | (2006.01) |
| *B29K 105/08* | (2006.01) |
| *B29C 70/46* | (2006.01) |

(52) U.S. Cl.
CPC ...... *A63B 53/0437* (2020.08); *A63B 53/0408* (2020.08); *B29C 43/00* (2013.01); *B29C 70/34* (2013.01); *A63B 53/0466* (2013.01); *A63B 2209/023* (2013.01); *B29C 70/465* (2013.01); *B29K 2063/00* (2013.01); *B29K 2105/089* (2013.01); *B29K 2307/04* (2013.01); *B29L 2031/5227* (2013.01)

(58) Field of Classification Search
CPC .................................................. A63B 53/0437
USPC .................................................. 473/324–350
See application file for complete search history.

(56) References Cited

U.S. PATENT DOCUMENTS

| | | | |
|---|---|---|---|
| 6,695,608 B2 | 2/2004 | Murphy et al. | |
| 6,875,124 B2 | 4/2005 | Gilbert et al. | |
| 7,074,136 B2 | 7/2006 | Noguchi et al. | |
| 7,101,289 B2 | 9/2006 | Gibbs et al. | |
| 7,137,907 B2 | 11/2006 | Gibbs et al. | |
| 7,163,468 B2 | 1/2007 | Gibbs et al. | |
| 7,166,038 B2 | 1/2007 | Williams et al. | |
| 7,169,060 B2 | 1/2007 | Stevens et al. | |
| 7,189,165 B2 * | 3/2007 | Yamamoto | A63B 60/00 473/248 |
| 7,258,626 B2 | 8/2007 | Gibbs et al. | |
| 7,261,645 B2 | 8/2007 | Oyama | |
| 7,267,620 B2 | 9/2007 | Chao et al. | |
| 7,278,927 B2 | 10/2007 | Gibbs et al. | |
| 7,291,075 B2 | 11/2007 | Williams et al. | |
| 7,303,488 B2 * | 12/2007 | Kakiuchi | A63B 60/00 473/346 |
| 7,306,527 B2 | 12/2007 | Williams et al. | |
| 7,311,613 B2 | 12/2007 | Stevens et al. | |
| 7,390,269 B2 | 6/2008 | Williams et al. | |
| 7,407,448 B2 | 8/2008 | Stevens et al. | |
| 7,410,428 B1 | 8/2008 | Dawson et al. | |

(Continued)

*Primary Examiner* — Alvin A Hunter
(74) *Attorney, Agent, or Firm* — Quarles & Brady LLP

(57) ABSTRACT

A method for forming a crownplate of a golf club head includes the steps of providing a first plurality of composite pre-preg plies, aligning the first plurality of pre-preg plies within a mold cavity in a first configuration in the shape of the crownplate, and heating the plurality of composite pre-preg plies to form the crownplate. The first configuration includes a first thickness area and a second thickness area. The second thickness area is thicker than the first thickness area.

18 Claims, 21 Drawing Sheets

(56) References Cited

U.S. PATENT DOCUMENTS

| | | |
|---|---|---|
| 7,413,519 B1 | 8/2008 | Dawson et al. |
| 7,413,520 B1 | 8/2008 | Hocknell et al. |
| 7,419,440 B2 | 9/2008 | Williams et al. |
| 7,419,442 B1 | 9/2008 | Alan et al. |
| 7,422,528 B2 | 9/2008 | Gibbs et al. |
| 7,431,666 B2 | 10/2008 | Vincent et al. |
| 7,431,667 B2 | 10/2008 | Vincent et al. |
| 7,448,960 B2 | 11/2008 | Gibbs et al. |
| 7,448,964 B2 | 11/2008 | Schweigert et al. |
| 7,455,598 B2 | 11/2008 | Williams et al. |
| 7,476,161 B2 | 1/2009 | Williams et al. |
| 7,488,261 B2 | 2/2009 | Cackett et al. |
| 7,494,424 B2 | 2/2009 | Williams et al. |
| 7,549,935 B2 | 6/2009 | Foster et al. |
| 7,559,851 B2 | 7/2009 | Cackett et al. |
| 7,568,982 B2 | 8/2009 | Cackett et al. |
| 7,578,751 B2 | 8/2009 | Williams et al. |
| 7,588,501 B2 | 9/2009 | Williams et al. |
| 7,591,737 B2 | 9/2009 | Gibbs et al. |
| 7,628,712 B2 | 12/2009 | Chao et al. |
| 7,637,822 B2 | 12/2009 | Foster et al. |
| 7,674,187 B2 | 3/2010 | Cackett et al. |
| 7,708,652 B2 | 5/2010 | Cackett et al. |
| 7,713,140 B2 | 5/2010 | Gibbs et al. |
| 7,749,096 B2 | 7/2010 | Gibbs et al. |
| 7,749,097 B2 | 7/2010 | Foster et al. |
| 7,798,203 B2 | 9/2010 | Schweigert et al. |
| 7,846,038 B2 | 12/2010 | Foster et al. |
| 7,850,542 B2 | 12/2010 | Cackett et al. |
| 7,850,546 B2 | 12/2010 | Chao et al. |
| 7,862,452 B2 | 1/2011 | Chao et al. |
| 7,871,340 B2 | 1/2011 | Chao et al. |
| 7,874,936 B2 | 1/2011 | Chao |
| 7,874,937 B2 * | 1/2011 | Chao .................. A63B 53/0466 473/342 |
| 7,874,938 B2 | 1/2011 | Chao |
| 8,012,041 B2 | 9/2011 | Gibbs et al. |
| 8,163,119 B2 | 4/2012 | Chao |
| 8,303,435 B2 | 11/2012 | Chao |
| 8,376,876 B2 | 2/2013 | Gibbs et al. |
| 8,425,349 B2 * | 4/2013 | Dawson ............. A63B 53/0466 473/345 |
| 8,460,592 B2 | 6/2013 | Breier et al. |
| 8,636,609 B2 | 1/2014 | Chao et al. |
| 8,696,489 B2 | 4/2014 | Gibbs et al. |
| 8,777,776 B2 | 7/2014 | Wahl et al. |
| 9,101,809 B2 | 8/2015 | Gibbs et al. |
| 9,358,430 B2 | 6/2016 | Greaney et al. |
| 9,844,708 B2 | 12/2017 | Greaney et al. |
| 10,143,903 B2 | 12/2018 | Greaney et al. |
| 10,576,335 B2 | 3/2020 | Greaney et al. |
| 10,596,432 B2 | 3/2020 | Greaney et al. |
| 10,695,624 B2 | 6/2020 | Parsons et al. |
| 2020/0222764 A9 | 7/2020 | Parsons et al. |

* cited by examiner

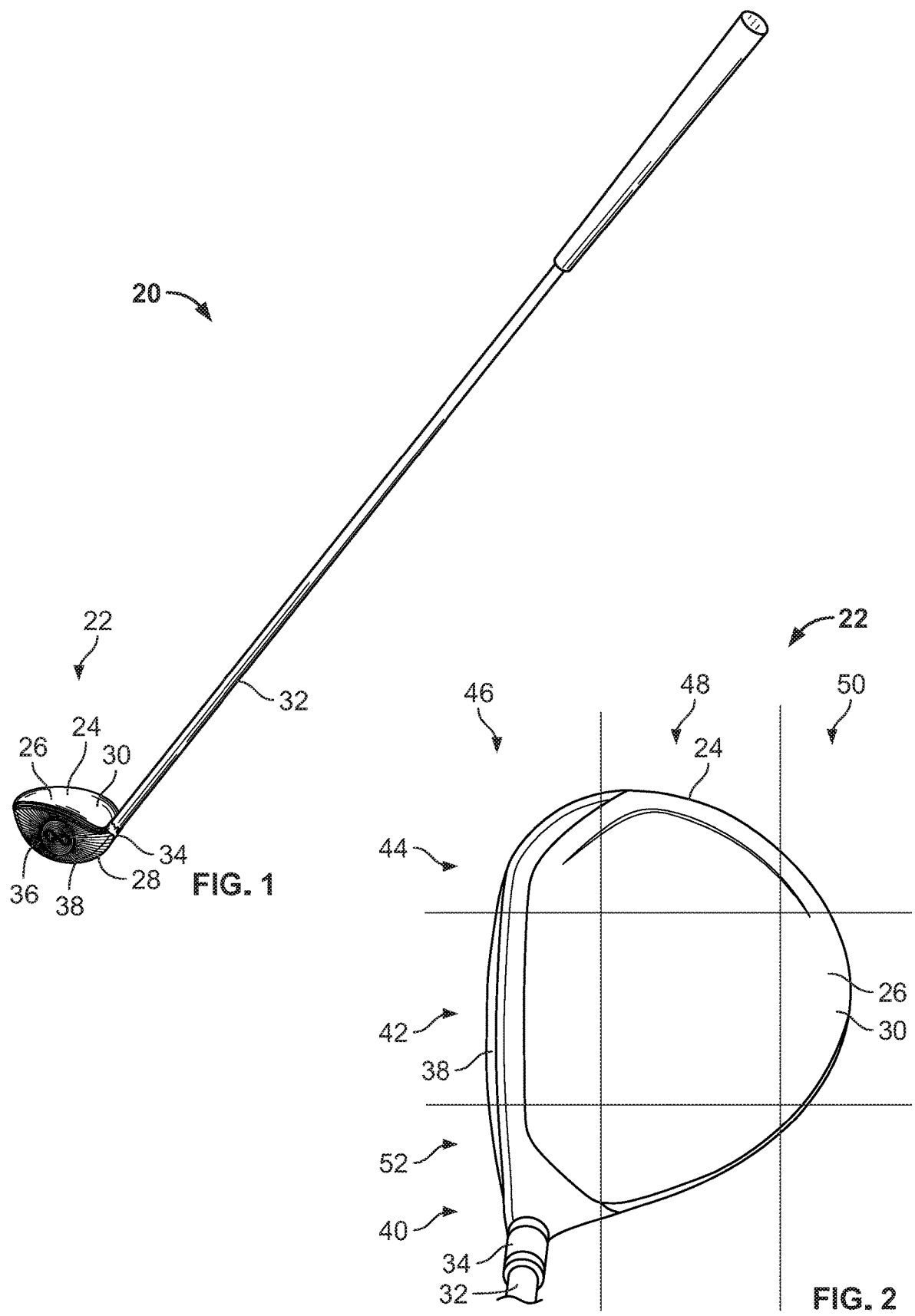

SYSTEMS AND METHODS FOR A VARIABLE THICKNESS CLUB HEAD

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

BACKGROUND

1. Field of the Disclosure

The present disclosure relates generally to graphite composite golf clubs having variable thickness, and more specifically, to driver heads having improved performance by reducing the weight of the composite panels used to manufacture same while maintaining acceptable durability requirements.

2. Description of the Background

Many golfers at all skill levels constantly seek to improve their performance and lower their golf scores. As a result, players are frequently seeking out updated and improved equipment. The performance of a golf club can vary based on several factors, including weight distribution about a club head of the golf club. The weight distribution about the club head generally affects a location of the center of gravity of the golf club head, as well as the mass moment of inertia. Distributing weight about the head in a targeted fashion can provide more forgiveness in a club head, improve accuracy, enhance spin control, and optimize golf ball trajectory. Still further, varying the weight along one or more regions of the club head can allow for increased weight at alternative locations that can improve club head performance.

Typically, driver and fairway wood club heads have a body that comprises a main material, such as titanium or steel. Many golf clubs are presently constructed by replacing some portions of this "heavier" main material, e.g., the crown, sole, skirt, face, hosel, aft areas, toe, heel, or any combination of these areas/features, with a lighter weight or lower density material. The lightweight material is generally strong enough to provide for durable head usage, but the lightweight nature of the material allows the head to weigh less than it otherwise would if, instead, it was made entirely from the main, heavier material. Weight that is saved by this newer construction, e.g., 2 g, 5 g, 7 g, 12 g, etc., is then reapplied to various locations along or within the club head to improve the effectiveness of the club head and/or to improve golf ball impact to achieve greater ball performance and consequently, longer shots.

Examples of these lightweight materials that are presently used for club head construction include titanium, aluminum, zirconium, plastics and polymers, and graphite composite materials that comprise sheet laminate, bulk molding compounds (BMC), or sheet molding compounds (SMC). However, a widely-used and desired lightweight material is graphite composite, which is made utilizing a method involving pre-preg sheet layup, where the pre-preg sheets are a constant thickness, allowing their long, continuous fibers to be oriented to achieve the greatest strength in loading and usage which, after laying up several of said sheets, creates a graphite composite panel which is typically in the range of between 0.50 mm and 1.25 mm thick. While SMC and BMC are alternative forms of graphite composite materials that can be used, SMC and BMC differ in construction from pre-preg sheet layup since they are made from shorter, cut/chopped fibers oriented randomly in their epoxy binder and consequently such parts are heavier than pre-preg sheet layup parts and cannot be made as thin with the same strength as pre-preg sheet layup. SMC and BMC parts due to their shorter fiber length, makes them less reliable from part to part since their fibers can be packed tightly into one region of the part, while not being present in the same region in the next part. To that end, when compared to a pre-preg layup construction, SMC and BMC parts are heavier and less consistent in durability from part to part and, therefore, not as desirable with respect to reducing weight or providing dependable strength to a golf club head. However, BMC heads can be easier to finish since parts implementing such a construction produces fewer pin-holes than pre-preg sheet construction, which requires secondary operations to make the finish look glossy without surface interruptions.

Several methods exist for making a graphite composite part, some of which include wet-layup, vacuum bagging, resin transfer, matched tooling, and insert molding. A matched metal process referred to as compression molding works well to provide: 1) an ability to make parts in a mass-production environment with lower cycle times; 2) an ability to maintain and provide near net shaping and surface smoothness to keep the panel design within tolerances; and 3) parts that have the mechanical properties and low void content to achieve the engineered needs.

When creating a part through compression molding, various factors are considered and implemented at the outset, such as the layup design and the directions of various plies, e.g., alternating ply directions, which dictate the resulting strength, weight, and appearance of the composite part. Cost is also a factor at the outset, since some plies are made with more expensive carbon fiber than others. Notwithstanding the various methods used to engineer and design composite sheets for utilization within the design of a golf club head, many other important decisions and considerations remain to be made including identifying the optimal weight of the head, providing for durable usage, creating cosmetically pleasing parts, preventing negative or detrimental sound characteristics, and managing the overall cost of the product.

Conventional compression molding uses a two-piece metal mold that is machined so that both mold halves contribute to the shape and volume of the part. While the term "mold halves" is used herein, this phrase is intended to refer to the two components comprising the mold, and these separate parts need not comprise 50% of the mold. Generally, the mold halves are designed to hold a precise, pre-set number of plies to obtain a particular thickness and dimensional shape of the resulting part. The composite parts, which are compression molded, are designed to comprise pre-preg plies of a constant thickness for a variety of reasons. One reason for using a constant ply thickness is that it results in a better aesthetic appearance. When areas of a resulting graphite part are made thicker, various edge borders of the thickened portions create a visual interruption along an otherwise smooth surface, which is typically apparent on both the inside and outside surfaces of the part. The interruptions generally result from curing process time differences. This delayed curing process can sometimes create a "sink" where a thickness of the composite part changes due to the fact that that portions of differing thicknesses cool at different rates.

Another reason for maintaining a constant thickness in composite part construction is that such a construction results in an easier-to-operate manufacturing process. When plies comprise the same shape and thickness, they are easier to be placed and fit into the mold cavity. When plies comprise different shapes or thicknesses for different part thicknesses in different areas, it creates additional effort by the manufacturer to place the plies into an exact placement in a repeatable manner. When such an orientation is desired, the plies can be oriented or "clocked" beyond the part boundary within which oversized pre-preg sheets fit. Such a process results in unnecessary excess material being used since a secondary process of trimming the composite part is thereafter required to obtain a proper perimeter shape.

Still another reason for maintaining a constant pre-preg ply thickness is that such a construction results in a lower part cost. Additional manufacturing steps are required to incorporate thicker sections, such as trimming the panel to the correct size. Yet another reason for maintaining a constant ply thickness is that generally, alternating a thickness results in a small weight difference across the body of the club. Due to the low density of pre-preg graphite composite material, some companies may feel implementing composite part designs with different or varying thicknesses do not yield enough of a weight difference to offset the typical difficulties and higher costs associated with the additional steps described above.

Notwithstanding the items listed above regarding the undesirable issues of molding pre-preg composite sheets at different thicknesses, saving or reducing weight from the composite panels in certain areas of a club head can allow for increased weighting along various other portions of the golf club head, which allows for enhanced club head optimization to obtain increased performance.

Therefore, methods and systems for providing a variable thickness of composite parts are desired.

SUMMARY

A method of forming a component for a golf club head, the method comprising the steps of providing a first plurality of composite pre-preg plies, aligning the first plurality of pre-preg plies within a mold cavity in a first configuration in the shape of the component, and by the molding process of applying heat and pressure to the plurality of composite pre-preg plies, forms the crownplate. The first configuration comprises a first thickness area, a second thickness area, and a third thickness area. The third thickness area is thicker than the second thickness area, and the second thickness area is thicker than the first thickness area.

In some embodiments, the step of aligning the first plurality of pre-preg plies includes forming one or more thickness boundaries between the first thickness area and the second thickness area. In some embodiments, the method further includes the step of providing a plurality of sacrificial sheets to define one or more of the first thickness area, the second thickness area, and the third thickness area. In some embodiments, the component is formed by compression molding. In some embodiments, in the first configuration, the first thickness area narrows from a front region of the component to a rear region of the crownplate.

In some embodiments, the first thickness area defines a thickness of between about 0.4 mm and about 0.70 mm. In some embodiments, the second thickness area defines a thickness of between about 0.45 mm and about 0.80 mm. In some embodiments, the third thickness area defines a thickness of between about 0.50 mm and about 0.90 mm. In some embodiments, the composite pre-preg plies comprise between about 0.050% and about 0.010% concentration by weight of graphene. In some embodiments, the first configuration further comprises a fourth thickness area that is thicker than the third thickness area. In some embodiments, the first configuration further comprises a fifth thickness area that is thicker than the fourth thickness area.

In some embodiments, a crownplate for a golf club head consists of a shell formed from a first plurality of pre-preg plies and a second plurality of pre-preg plies and defining a first thickness area and a second thickness area. The second thickness area is thicker than the first thickness area, the first plurality of pre-preg plies comprise a first modulus of elasticity, the second plurality of pre-preg plies comprise a second modulus of elasticity, and the first modulus of elasticity is higher than the second modulus of elasticity. In some embodiments, the crownplate is formed by compression molding. In some embodiments, the first thickness area defines a thickness of between about 0.40 mm and about 0.70 mm. In some embodiments, the second thickness area defines a thickness of between about 0.45 mm and about 0.80 mm. In some embodiments, the third thickness area defines a thickness of between about 0.50 mm and about 0.90 mm. In some embodiments, the composite pre-preg plies comprise between about 0.050% and about 0.100% concentration by weight of graphene.

In some embodiments, a method of forming a crownplate for a golf club head includes the steps of providing a first plurality of composite pre-preg plies, aligning the first plurality of pre-preg plies in a first configuration in the shape of the crownplate, and heating the plurality of composite pre-preg plies to form the crownplate. In some embodiments, the first configuration comprises a first thickness area, a second thickness area, and a third thickness area. The third thickness area is thicker than the second thickness area, and the second thickness area is thicker than the first thickness area. A second configuration of the crownplate comprises a constant thickness of 0.85 mm. The first configuration defines a crownplate having a weight savings of between about 1.8 g and about 4.6 g compared against the second configuration.

In some embodiments, the first configuration defines a crownplate having a weight savings of between about 2.0 g and about 2.6 g compared against the second configuration. In some embodiments, the first thickness area defines a thickness of between about 0.40 mm and about 0.70 mm, the second thickness area defines a thickness of between about 0.45 mm and about 0.80 mm, and the third thickness area defines a thickness of between about 0.50 mm and about 0.90 mm.

BRIEF DESCRIPTION OF THE DRAWINGS

FIG. 1 is a front, top, and left isometric view of a golf club having a club head in accordance with the present disclosure;

FIG. 2 is a detail top view highlighting a crown of the club head of FIG. 1;

DETAILED DESCRIPTION OF THE DRAWINGS

Figure 3A:
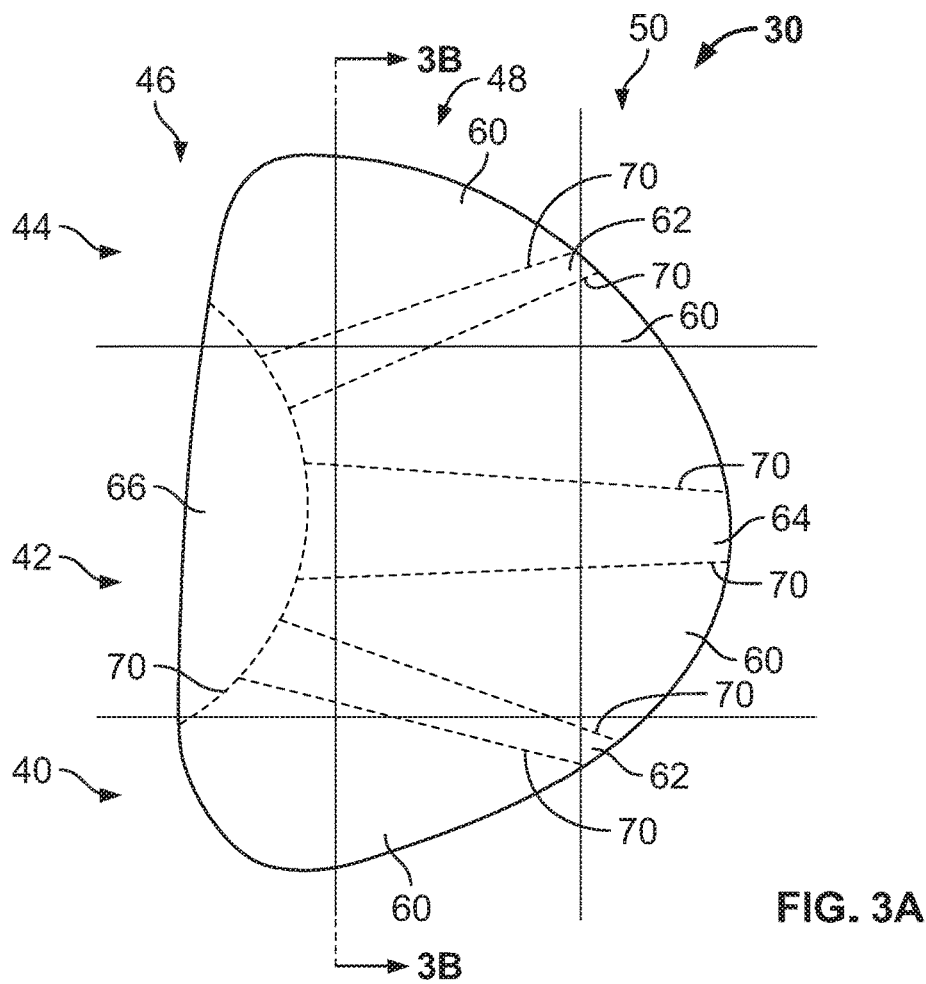
FIG. 3A is a first schematic view of the crown of FIG. 2.

The following discussion and accompanying figures disclose various embodiments or configurations of a golf club head comprising portions made of graphite composite having varying thicknesses or strengths. Varying a thickness or strength of the graphite composite used for a crown or other portions of the club head allows for improved performance of the club head by reducing the weight of the composite panel while maintaining acceptable durability requirements and stiffness requirements set forth by the United States Golf Association ("USGA"). As used herein, the terms "mass" and "weight" are used interchangeably, although it is understood that these terms refer to different properties in a strict physical sense. As further used herein, the terms "pre-preg composite" is used to refer to pre-preg type graphite sheet construction.

The following discussion and accompanying figures disclose various embodiments or configurations of a golf club that includes a shaft and a golf club head. Although embodiments are disclosed with reference to a wood-type golf club, such as a driver, concepts associated with embodiments of the wood-type golf club may be applied to a wide range of golf clubs. For example, embodiments disclosed herein may be applied to a number of golf clubs including hybrid clubs, fairway wood clubs, putter-type clubs, iron-type golf clubs, utility-type golf clubs, and the like. The term "about," as used herein, refers to variation in the numerical quantity that may occur, for example, through typical measuring and manufacturing procedures used for articles of manufacture that may include embodiments of the disclosure herein. Throughout the disclosure, the terms "about" and "approximately" refer to a range of values±5% of the numeric value that the term precedes.

Example golf club and golf club head structures in accordance with this disclosure may relate to "wood-type" golf clubs and golf club heads, e.g., clubs and club heads typically used for drivers and fairway woods, as well as for "wood-type" utility or hybrid clubs, or the like. Although these club head structures may have little or no actual "wood" material, they still may be referred to conventionally in the art as "woods", e.g., "metal woods" or "fairway woods." Alternatively, golf club and golf club head structures of the disclosure may relate to "iron-type" golf clubs and golf club heads.

The term "pre-preg composite" as used herein refers to "pre-impregnated" composite fibers to which a thermoset polymer matrix material (hereinafter "matrix material") has already been applied. The matrix material can include epoxy or another type of thermoplastic resin. The composite fibers often take the form of a weave, e.g., a plain weave, a satin weave, a twill weave, etc., and the matrix material is used to bond the fibers together and to other components during manufacture. In many applications, the matrix material is only partially cured before manufacture of the club head, which can allow for easier handling. Pre-preg composite allows one to impregnate the fibers on a flat workable surface during industrial processing, and later form the impregnated fibers to a desired shape. Pre-preg composite sheets are manufactured with varied specifications, including strength, stiffness, fiber areal weight, thickness, ply orientation, quality of manufacture, and resin systems.

In some embodiments, the composite fibers that are used for construction of the club heads disclosed herein may have graphene added thereto, which has been found to substantially increase fiber strength. For example, through experimentation it has been found that adding between about 0.050% and about 0.100% concentration by weight of graphene to the carbon fiber that is used can significantly increase strength of the finished parts, as disclosed herein. In some embodiments, graphene may be added in an amount of between about 0.060% and about 0.090% concentration by weight, or between about 0.070% and about 0.080% concentration by weight, or about 0.075% concentration by weight to increase the strength of the composite or carbon fibers that are used to form the parts disclosed herein.

To form the parts that comprise a golf club head, pre-preg graphite sheet pieces are cut or stamped to a desired shape, and positioned into a first portion of a mold such that the fibers of the pre-preg composite are arranged according to a desired orientation. In some cases, plies of the pre-preg composite are assembled in a secondary tool or device called a pre-compaction tool, where several plies are stacked, pressed together, and placed into the compression mold as an assembly or sub-assembly. A second portion of the mold can be fit precisely into place, thereby encompassing the graphite sheets into a defined volume to achieve the desired thickness. The two mold halves or portions are coupled to one another and are positioned into a heated press. The mold halves are kept firmly in place while heat and pressure cures the resin or matrix material that is contained within the pre-preg composite sheets. After the desired heating or "bake," the mold is removed from the heat press, allowed to cool, and the first and second halves thereof are separated, allowing access to the composite part that has been formed. The mold is cleaned, and the process is repeated to create additional composite parts since it is desirable to keep the cycle times low and the press constantly operating.

In some embodiments, pre-preg plies having a higher tensile strength or modulus of elasticity are provided in or along one or more regions of the club head, while pre-preg plies having a lower tensile strength or modulus of elasticity are provided in or along one or more other regions of the club head. As discussed above with respect to plies of constant thickness being placed to achieve varying thicknesses along the club head, higher and lower modulus plies may also or alternatively be provided in a particular configuration based on desirable stress, sound, weight, and performance targets. Such a club head construction advances the performance of golf club heads by improving the strength and reducing the weight of composite panels used for club head construction, while maintaining acceptable durability and cosmetic requirements.

For example, composite panels may be made lighter by inserting partial plies that comprise higher-rated strength into areas of a club head or component thereof that may be subjected to greater stress loading from ball strikes and thumb pressure tests thereby reducing the number of standard strength that is typically used for club head component construction. The partial plies discussed hereinafter create the thickness areas 60, 62, 64, 66, 68 discussed above, since stacking partial plies in combination with full plies creates thickened areas. The partial plies having a higher strength rating may be used in combination with full-sized plies that have a lower or standard strength rating. In some examples the higher-rated strength plies may have a tensile strength of, e.g., 5,000-7,100 MPa, while the standard strength plies may have a tensile strength of, e.g., 3,400-5,000 MPa. While some of the embodiments discussed herein comprise plies of varying tensile strength ratings, it is contemplated that the plies discussed herein may be defined by other variables related to material strength, i.e., material strength characteristics. For example, the various pre-preg plies may comprise varying moduli of elasticity, tensile strengths, flexural strengths, flexural moduli, or compression strengths. To that end, plies having a higher material strength characteristic may be used in combination with plies having a lower material strength characteristic.

The purpose of the following disclosure is to provide a lighter weight, but sufficiently strong compression molded composite part or parts that comprise one or more composite panels provided in various regions of a club head so as to thicken or modify the tensile strength of portions of the club head where greater loading has been identified. The loading may result from stress caused by the club head striking the ball or from thumb pressure that may be applied to determine a stiffness of the composite panel for USGA conformance. While this disclosure focuses on composite parts that comprise a crownplate of the club head, it is contemplated that the method of thickening or varying the tensile strength of pre-preg composite panels as disclosed herein could be implemented with other components or portions of a club head, such as a sole or skirt portion.

The various embodiments provided herein have been identified as having optimal or beneficial thickening of various portions of a composite panel. The thickening of various areas of the crownplate allows for thinning other portions of the crownplate, which provides for a reduction in weight, while maintaining strength in particular areas of stress, so as to maintain performance while reducing weight of the component. Such a weight reduction allows for adding weight to more desirable regions within or along the club head.

The embodiments shown in FIGS. 3A-17B include schematic views of crownplates comprising various thickened regions, which have been thickened by inserting pre-preg plies into the layup process according to the following disclosure so as to achieve a desired crownplate design. This process can be achieved by building up thickened regions, which can be adjusted or altered by modifying an order in which smaller cut plies ("smaller plies") are placed into the mold during the manufacturing process. For example, the smaller plies can be placed into the mold sequentially such that they are inserted first, the smaller plies may be interspersed between full or larger area plies, or the smaller plies can be inserted in a descending order after larger area plies have been placed into the mold to create the crownplate design. Such panel ply layup sequence strategies are predetermined so that the mold can be prospectively machined to reflect the extent that thickened regions are so disposed.

For example, the thickened areas can be extending inward, toward an interior of the club head so that an exterior surface remains smooth, with no outward indication of varying thickness of the plate. Alternatively, the thickened areas can extend outward where the thickness differences are visible to a consumer. Still further, in some embodiments, the thickened areas may be varied so that some thickness change is visible along either side of the panel. The shape of the machined volume within the mold determines how these distinct thickened regions are manufactured based upon cosmetic and/or strength needs; however, the present disclosure contemplates each of the foregoing possibilities.

There also exists another method where the crownplate mold can be cut to replicate a constant thickness part and the plies that represent thicker regions are applied within. Implementing such a method includes the use of sacrificial sheets that comprise a separate, non-stick material, such as paper ("secondary material"), which are precisely cut to fit around the thicker composite plies and the mold cavity edge. The secondary material provides full coverage across various areas of the composite part so that the pre-molded part comprises a constant thickness before molding such that it can be compacted in a uniform manner during the molding process. After removing the composite part from the mold, the secondary material is then peeled off or otherwise removed, revealing the composite panel that comprises regions or areas that are relatively thicker than other regions or areas. As used herein, the term "region" defines a three-dimensional volume, while the term "area" refers to a two-dimensional surface area.

Referring now to FIG. 1, a golf club 20 is illustrated according to the present disclosure, the golf club 20 being shown at address and comprising a golf club head 22 that includes a body 24 having a crown 26 and a sole 28. The crown 26 comprises an exterior shell or crownplate 30 defining varying thicknesses according to one or more of the manufacturing methods discussed above. A golf club shaft 32 extends from a hosel 34 that extends from the body 24 of the club head 22. Aerodynamic features 36 are located along a face 38 of the club head 22. One or more aerodynamic features may be provided along the face 38 of the club head 22, such as those disclosed within U.S. patent application Ser. No. 16/249,317, which is incorporated by reference herein in its entirety. The face 38 or portions of the body 24 may define any number of aerodynamic features, and the aerodynamic feature 36 is included for illustrative purposes only.

Referring to FIG. 2, a top view of the golf club head 22 of FIG. 1 is shown, which highlights the crown 26 and the crownplate 30, and varying regions of the club head 22 that are illustrated with a coordinate system overlaid thereon. The shaft 32 is shown extending from the hosel 34 within a heel region 40. A medial region 42 is disposed adjacent the heel region 40, the medial region 42 being disposed between the heel region 40 and a toe region 44. The toe region 44 is shown opposite the heel region 40. The club head 22 further defines a front region 46, which comprises the face 38, and an intersection of the face 38 with the crownplate 30. A central region 48 is disposed adjacent the front region 46, and a rear region 50 is separated from the front region 46 by the central region 48. Each of the regions 40, 42, 44, 46, 48, 50 may be referred to herein as a first region, a second region, a third region, a fourth region, a fifth region, or a sixth region, and need not be limited to a serial or numerical limitation, but instead are used to distinguish or identify various regions. To that end, unless otherwise specified, the terms first, second, third, fourth, fifth, and sixth as used herein need not be limited to a serial or numerical limitation.

Still referring to FIG. 2, the regions 40, 42, 44, 46, 48, 50 define a grid that comprises three rows and three columns, i.e., an m×n grid where m and n are each 3. The grid defines nine sub-regions, each of which is disposed in one of the heel region 40, the toe region 44, and the medial region 42, and one of the front region 46, the central region 48, and the rear region 50. While all of the sub-regions are not specifically referenced herein, it should be appreciated that each location along the crownplate 30 defines a coordinate that can be considered to be disposed within a subregion defined by two of the regions 40, 42, 44, 46, 48, 50. For example, the hosel 34 is located within the heel region 40 and the front region 46, and may be referred to as being disposed within a front, heel subregion 52 of the crownplate. While there are nine subregions that are defined by the grid, only certain subregions are identified herein to avoid confusion. However, it should be noted that the various subregions are defined by the intersections of the various regions 40, 42, 44, 46, 48, 50 disclosed herein. The following disclosure describes varying configurations of thickened regions in accordance with the grid overlaid upon the club head 22 depicted in FIG. 2.

Figure 3B:
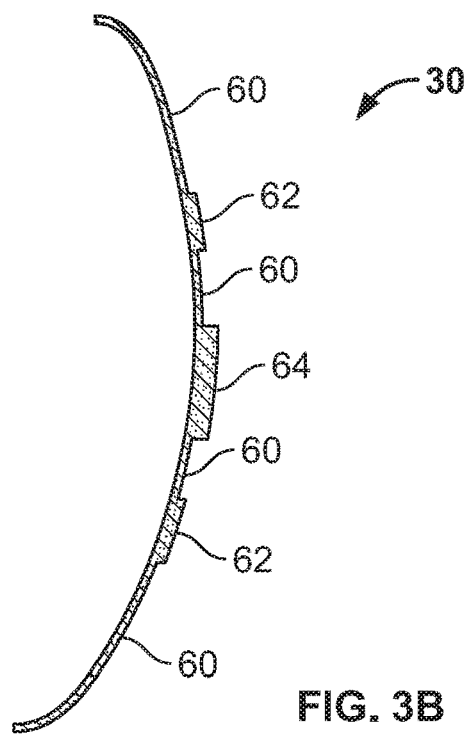
FIG. 3B is a cross-sectional view taken through line 3B-3B of FIG. 3A.

FIG. 3A is a first schematic view of the crownplate 30 of FIG. 2, which highlights various areas of varying thicknesses, while FIG. 3B is a cross-sectional view taken through line 3B-3B of FIG. 3A. A first thickness area 60, a second thickness area 62, a third thickness area 64, and a fourth thickness area 66 are depicted in FIG. 3A, each of the first thickness area 60, the second thickness area 62, the third thickness area 64, and the fourth thickness area 66 defining differing thicknesses along the crownplate 30. A fifth thickness area 68 may also be included (see FIG. 11A), but is not included within the schematic of FIG. 3A. In addition to the thickness areas shown throughout the disclosure, one or more additional first thickness areas 60, second thickness areas 62, third thickness areas 64, fourth thickness areas 66, or fifth thickness areas 68 may be provided along the crownplate 30 disclosed herein, and the embodiments need not be limited to the schematics that are shown.

As discussed herein, the first thickness area 60 defines the thinnest portion of the crownplate 30 of FIG. 3A, while the fifth thickness area 68 defines the thickest portion of the crownplate 30. The second thickness area 62 is thicker than the first thickness area 60, the third thickness area 64 is thicker than the second thickness area 62, the fourth thickness area 66 is thicker than the third thickness area 64, and the fifth thickness area 68 is thicker than the fourth thickness area 66. In the embodiment of FIG. 3A, there are four of the first thickness areas 60, two of the second thickness areas 62, one of the third thickness areas 64, and one of the fourth thickness areas 66. In some embodiments, there are only two of the thickness areas, i.e., the first thickness area 60 and the second thickness area 62.

With respect to the particular thicknesses within each of the thickness areas 60, 62, 64, 66 disclosed in FIG. 3A and shown in the cross-sectional view of FIG. 3B, the first thickness area 60 defines a thickness of between about 0.40 mm and about 0.60 mm, or between about 0.45 mm and about 0.55 mm, or about 0.50 mm. The second thickness area 62 defines a thickness of between about 0.55 mm and about 0.75 mm, or between about 0.60 mm and about 0.70 mm, or about 0.65 mm. The third thickness area 64 defines a thickness of between about 0.65 mm and about 0.85 mm, or between about 0.70 mm and about 0.80 mm, or about 0.75 mm. The fourth thickness area 66 defines a thickness of between about 0.75 mm and about 0.95 mm, or between about 0.80 mm and about 0.90 mm, or about 0.85 mm. The schematic shown in FIG. 3A results in a weight savings of about 4.60 g along the crownplate 30 when compared to a crownplate of the same profile having a constant thickness of 0.85 mm.

While the various embodiments disclosed herein each comprise at least the first thickness area 60, the second thickness area 62, and the third thickness area 64 (among additional possible thickness areas), the thickness ranges attributable to the various thickness areas 60, 62, 64, 66 should not be imputed from one embodiment to the next. To that end, the structural configurations of each embodiment disclosed herein are particular to each particular embodiment, and are disclosed as such. Further, additional thickness areas may be provided within the various regions 40, 42, 44, 46, 48, 50 that are not specifically disclosed herein. Still further, the various thickness areas disclosed herein are separated by boundaries or intersections 70 that define the intersections between the various thickness areas, which are the result of one or more of the manufacturing techniques discussed above.

Still referring to FIGS. 3A and 3B, the first thickness areas 60 span portions of each of the regions 40, 42, 44, 46, 48, 50. The second thickness areas 62 also span portions of each of the regions 40, 42, 44, 46, 48, 50. The third thickness area 64 spans only the medial region 42, the front region 46, the central region 48, and the rear region 50. The fourth thickness area 66 spans the front region 46, the heel region 40, the medial region 42, and the toe region 44. The first thickness areas 60 are each disposed adjacent to, and extend from, the fourth thickness area 66, which defines an arc-shape within the front region 46. The two second thickness areas 62 are disposed adjacent to, and extend from, the fourth thickness area 66, the second thickness areas 62 each narrowing from the front region 46 to the rear region 50. The third thickness area 64 is disposed adjacent to and extends from the fourth thickness area 66, the third thickness area 64 being centrally located within the medial region 42 and narrowing from the front region 46 to the rear region 50. The second thickness areas 62 and the third thickness area 64 each extend radially from the fourth thickness area 66, and are separated by first thickness areas 60.

Figure 4A:
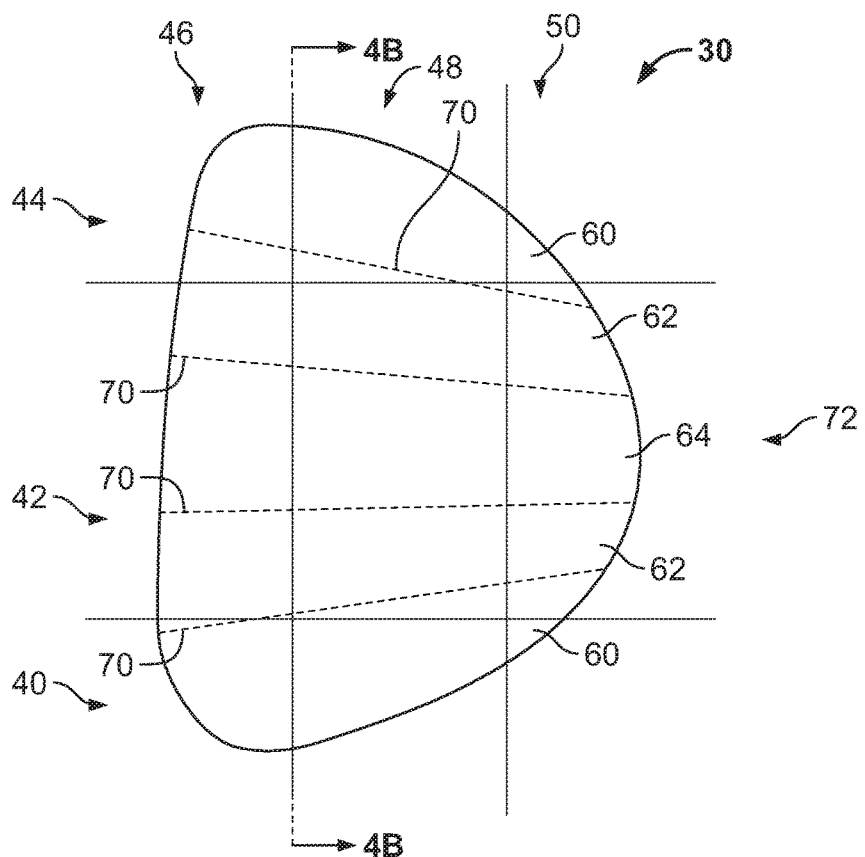
FIG. 4A is a second schematic view of the crown of FIG. 2.
Figure 4B:
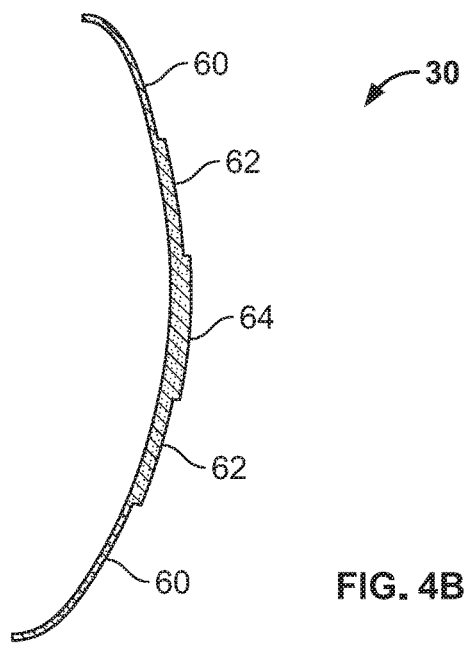
FIG. 4B is a cross-sectional view taken through line 4B-4B of FIG. 4A.

Now referring to FIG. 4A, a second schematic view of the crownplate 30 of FIG. 2 is shown. FIG. 4B illustrates a cross-sectional view taken through line 4B-4B of FIG. 4A. The schematic of FIG. 4A includes two of the first thickness areas 60, two of the second thickness areas 62, and one of the third thickness areas 64. As noted above, each of the first, second, and third thickness areas 60, 62, 64 define different thicknesses along the crownplate 30 and are separated at the various thickness boundaries 70. The first thickness area 60 defines the thinnest portion of the crownplate 30 of FIG. 4A, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 4A, the two first thickness areas 60 and the two second thickness areas 62 are each disposed along opposing sides of the third thickness area 64.

With respect to the particular thicknesses within each of the thickness areas 60, 62, 64 disclosed in FIG. 4A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.65 mm and about 0.85 mm, or between about 0.70 mm and about 0.80 mm, or about 0.75 mm. The schematic shown in FIG. 4A results in a weight savings of about 2.60 g along the crownplate 30 when compared with a crownplate of the same profile having a constant thickness of 0.85 mm.

Still referring to FIG. 4A, the first thickness areas 60 span portions of each of the regions 40, 42, 44, 46, 48, 50. The second thickness areas 62 also span portions of each of the regions 40, 42, 44, 46, 48, 50. The third thickness area 64 spans only the medial region 42, the front region 46, the central region 48, and the rear region 50. The first thickness areas 60 are each disposed along peripheral portions of the toe region 44 and the heel region 40, and narrow from the front region 46 to the rear region 50. The second thickness areas 62 are each disposed intermediate the first thickness areas 60 and the third thickness area 64, and narrow from the front region 46 to the rear region 50. The third thickness area 64 is disposed centrally within the medial region 42, between the second thickness areas 62, and narrows from the front region 46 to the rear region 50. Each of the first, second, and third thickness areas 60, 62, 64 extend from the front region 46 to the rear region 50, and terminate within a medial, rear subregion 72. Each of the intersections between the first, second, and third thickness areas 60, 62, 64 define boundaries 70 that are straight and non-parallel, and lines that extend through the boundaries 70 would intersect at a point spaced from the heel region 40 of the club head 22 within the medial region to form acute angles.

Figure 5A:
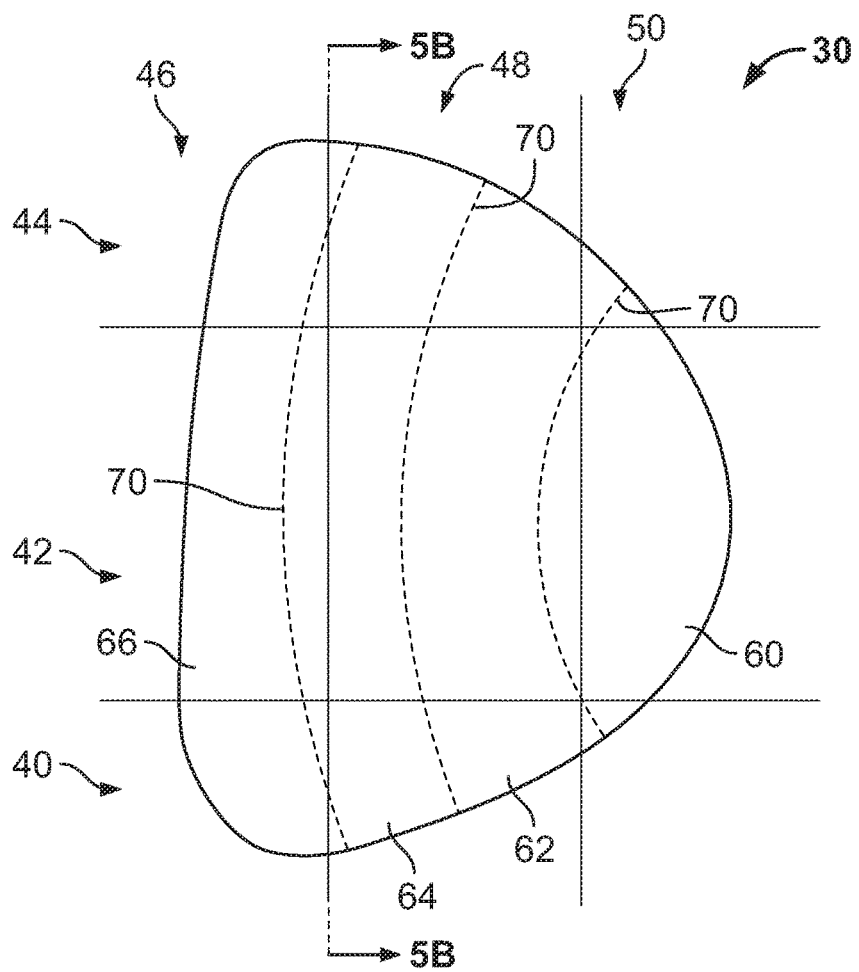
FIG. 5A is a third schematic view of the crown of FIG. 2.
Figure 5B:
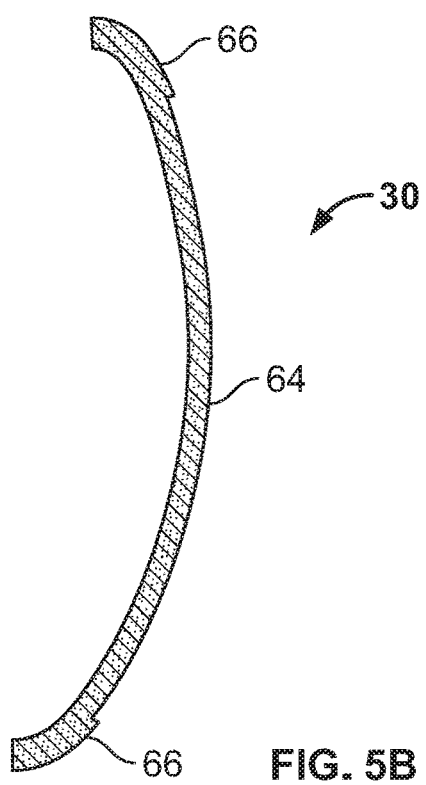
FIG. 5B is a cross-sectional view taken through line 5B-5B of FIG. 5A.

Now referring to FIG. 5A, a third schematic view of the crownplate 30 of FIG. 2 is shown. FIG. 5B illustrates a cross-sectional view taken through line 5B-5B of FIG. 5A. The schematic of FIG. 5A includes one of the first thickness areas 60, one of the second thickness areas 62, one of the third thickness areas 64, and one of the fourth thickness areas 66. As noted above, each of the first, second, third, and fourth thickness areas 60, 62, 64, 66 define different thicknesses along the crownplate 30. The first thickness area 60 defines the thinnest portion of the crownplate 30 of FIG. 5A, while the fourth thickness area 66 defines the thickest portion of the crownplate 30. The second thickness area 62 is thicker than the first thickness area 60, the third thickness area 64 is thicker than the second thickness area 62, and the fourth thickness area 66 is thicker than the third thickness area 64. In the particular embodiment shown in FIG. 5A, the fourth thickness area 66 is disposed closest to the face 38 of the club head 22, the first thickness area 60 is disposed farthest from the face 38 of the club head 22, and the second and third thickness areas 62, 64 are disposed intermediate the first and second thickness areas 60, 62.

With respect to the particular thicknesses within each of the thickness areas 60, 62, 64 disclosed in FIG. 5A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.60 mm and about 0.80 mm, or between about 0.65 mm and about 0.75 mm, or about 0.70 mm. The fourth thickness area 66 defines a thickness of between about 0.70 mm and about 0.90 mm, or between about 0.75 mm and about 0.85 mm, or about 0.80 mm. The schematic shown in FIG. 5A results in a weight savings of about 2.60 g along the crownplate 30 when compared with a crownplate of the same profile having a constant thickness of 0.85 mm.

Still referring to FIG. 5A, the first thickness areas 60 spans each of the heel region 40, the medial region 42, the toe region 44, the rear region 50, and the central region 48. The second thickness area 62 spans each of the heel region 40, the medial region 42, the toe region 44, the rear region 50, and the central region 48. The third thickness area 64 spans each of the heel region 40, the medial region 42, the toe region 44, the front region 46, and the central region 48. The fourth thickness area 66 spans each of the heel region 40, the medial region 42, the toe region 44, the front region 46, and the central region 48. Each of the first, second, third, and fourth thickness areas 60, 62, 64, 66 define generally curved or bowed boundaries 70 with the respective areas disposed adjacent to each of the first, second, third, and fourth thickness areas 60, 62, 64, 66.

It is noted that the boundaries 70 shown in FIG. 5A define curved portions having differing radii of curvature, such that the boundary 70 between the first thickness area 60 and the second thickness area 62 defines a smaller radius of curvature than the boundary 70 between the second thickness area 62 and the third thickness area 64. The boundary 70 between the second thickness area 62 and the third thickness area 64 defines a smaller radius of curvature than the boundary 70 between the third thickness area 64 and the fourth thickness area 66. However, in some embodiments, the boundary 70 between the first thickness area 60 and the second thickness area 62 defines a larger or equivalent radius of curvature than the boundary 70 between the second thickness area 62 and the third thickness area 64. Still further, in some embodiments the boundary 70 between the second thickness area 62 and the third thickness area 64 defines a larger or equivalent radius of curvature than the boundary 70 between the third thickness area 64 and the fourth thickness area 66.

Figure 6A:
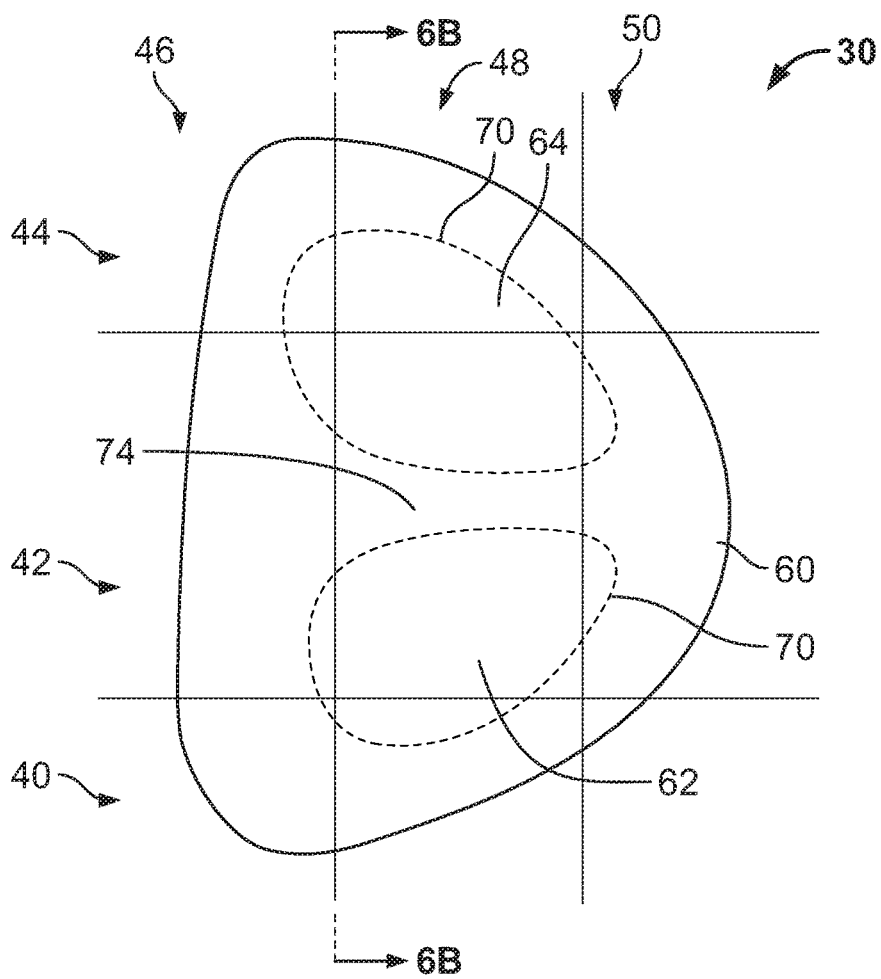
FIG. 6A is a fourth schematic view of the crown of FIG. 2.
Figure 6B:
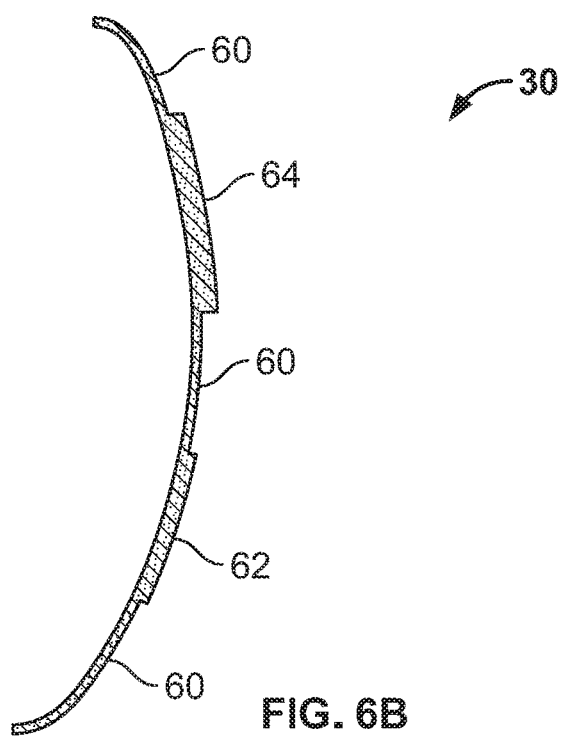
FIG. 6B is a cross-sectional view taken through line 6B-6B of FIG. 6A.

FIG. 6A is a fourth schematic view of the crownplate 30 of FIG. 2. FIG. 6B illustrates a cross-sectional view taken through line 6B-6B of FIG. 6A. The schematic of FIG. 6A includes one of the first thickness areas 60, one of the second thickness areas 62, and one of the third thickness areas 64. As noted above, each of the first, second, and third thickness areas 60, 62, 64 define different thicknesses along the crownplate 30. The first thickness area 60 defines the thinnest portion of the crownplate 30, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 6A, the second thickness area 62 and the third thickness area 64 are each disposed interior to the first thickness area 60, and define oblong, ovoidal shapes. The second thickness area 62 is disposed closer to the heel region 40, while the third thickness area is disposed closer to the toe region 44 of the club head 22. In some embodiments, the locations of the second thickness area 62 and the third thickness area 64 may be switched.

With respect to the particular thicknesses within each of the thickness areas 60, 62, 64 disclosed in FIG. 6A, the first thickness area 60 defines a thickness of between about 0.50 mm and about 0.70 mm, or between about 0.55 mm and about 0.65 mm, or about 0.60 mm. The second thickness area 62 defines a thickness of between about 0.60 mm and about 0.80 mm, or between about 0.65 mm and about 0.75 mm, or about 0.70 mm. The third thickness area 64 defines a thickness of between about 0.70 mm and about 0.90 mm, or between about 0.75 mm and about 0.85 mm, or about 0.80 mm. The schematic shown in FIG. 6A results in a weight savings of about 2.50 g along the crownplate 30 when compared with a crownplate of the same profile having a constant thickness of 0.85 mm.

Still referring to FIG. 6A, the first thickness area 60 spans all of the regions 40, 42, 44, 46, 48, 50. The second thickness area 62 spans the heel region 40, the medial region 42, the front region 46, the central region 48, and the rear region 50. The third thickness area 64 spans the medial region 42, the toe region 44, the front region 46, the central region 48, and the rear region 50. The second thickness area 62 and the third thickness area 64 are separated by a narrow portion 74 of the first thickness area 60 that spans from the front region 46 to the rear region 50. The third thickness area 64 is larger than the second thickness area 62, and the first thickness area 60 is larger than each of the second thickness area 62 and the third thickness area 64.

Figure 7A:
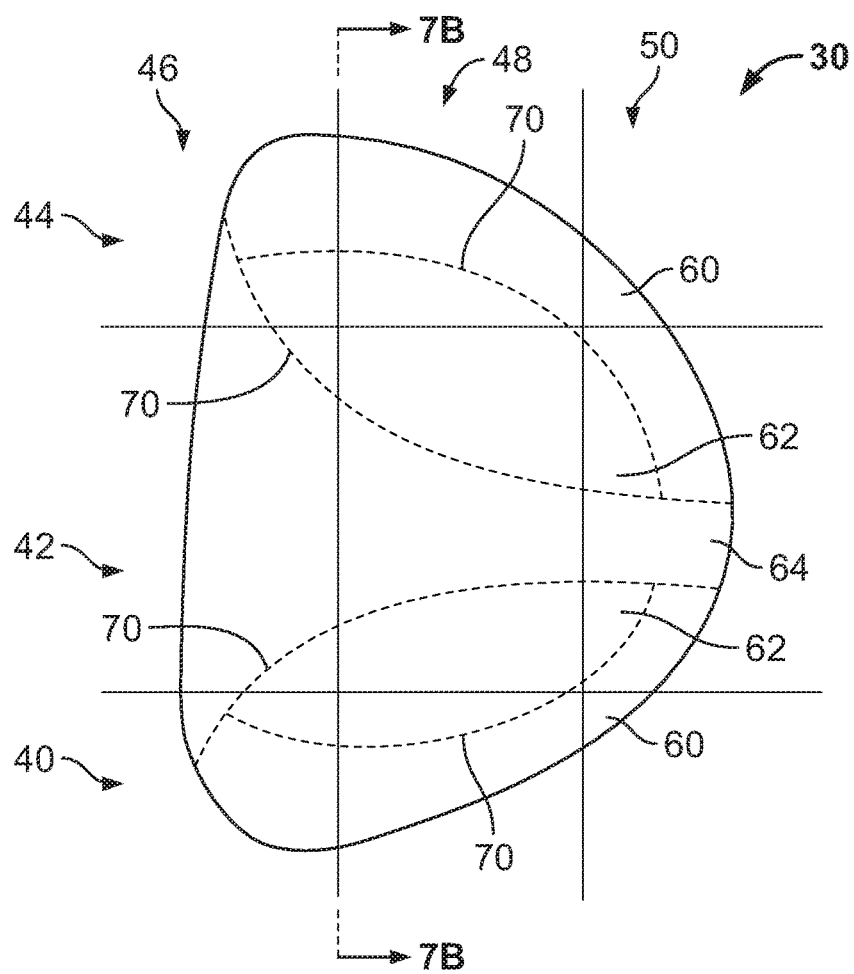
FIG. 7A is a fifth schematic view of the crown of FIG. 2.
Figure 7B:
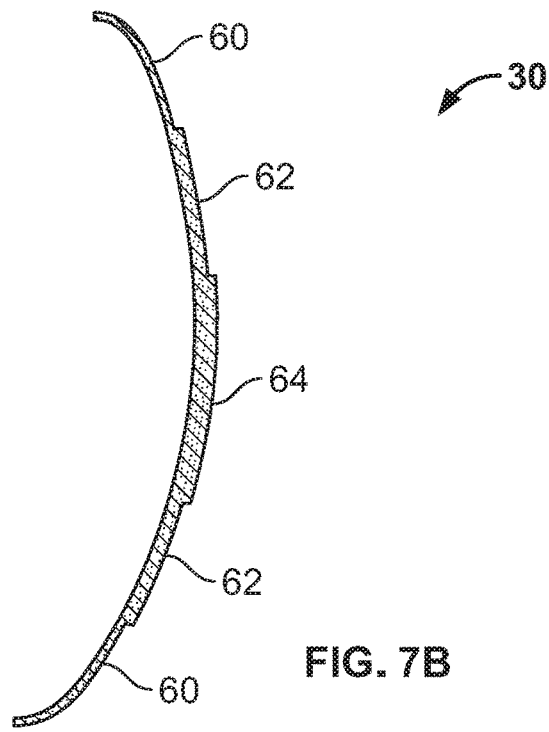
FIG. 7B is a cross-sectional view taken through line 7B-7B of FIG. 7A.

Now referring to FIG. 7A, a fifth schematic view of the crownplate 30 of FIG. 2 is shown. FIG. 7B illustrates a cross-sectional view taken through line 7B-7B of FIG. 7A.

The schematic of FIG. 7A includes two of the first thickness areas 60, two of the second thickness areas 62, and one of the third thickness areas 64. As noted above, each of the first, second, and third thickness areas 60, 62, 64 define different thicknesses along the crownplate 30. The first thickness area 60 defines the thinnest portion of the crownplate 30 of FIG. 7A, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 7A, the second thickness areas 62 are disposed between the two first thickness areas 60 and the third thickness area 64.

With respect to the particular thicknesses within each of the thickness areas 60, 62, 64 disclosed in FIG. 7A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.60 mm and about 0.80 mm, or between about 0.65 mm and about 0.75 mm, or about 0.70 mm. The schematic shown in FIG. 7A results in a weight savings of about 1.80 g along the crownplate 30 when compared with a crownplate of the same profile having a constant thickness of 0.85 mm.

Still referring to FIG. 7A, the first thickness areas 60 span all of the regions 40, 42, 44, 46, 48, 50. The second thickness areas also span all of the regions 40, 42, 44, 46, 48, 50. The third thickness area 64 also spans all of the regions 40, 42, 44, 46, 48, 50. The first thickness areas 60 are disposed along peripheries of the heel region 40 and the toe region 44 and intersect with the third thickness area 64 within the front region 46 and the rear region 50. The second thickness areas 62 are disposed intermediate the first thickness areas 60 and the third thickness area 64. The second thickness areas 62 define pointed oval shapes. The second thickness area 62 that spans the toe region 44 is larger than the second thickness area 62 that spans the heel region 40. The third thickness area 64 defines an outwardly-flared v-shape. The boundaries 70 between each of the thickness areas 60, 62, 64 are curved.

Figure 8A:
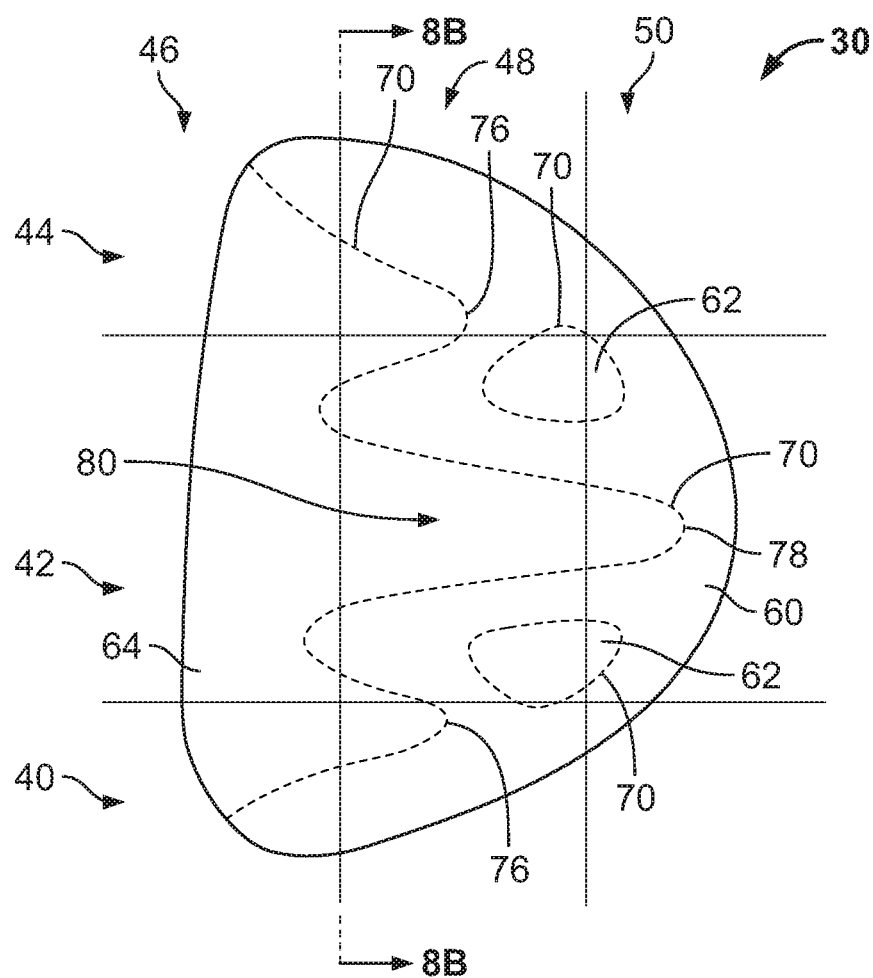
FIG. 8A is a sixth schematic view of the crown of FIG. 2.
Figure 8B:
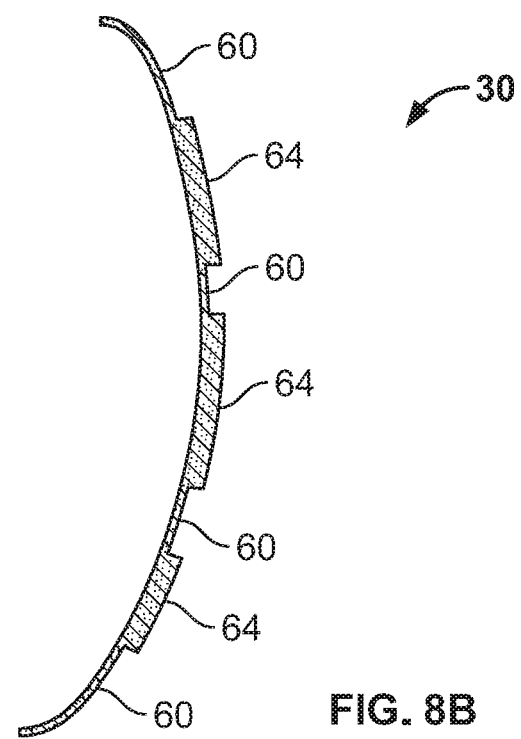
FIG. 8B is a cross-sectional view taken through line 8B-8B of FIG. 8A.

FIG. 8A illustrates a sixth schematic view of the crownplate 30 of FIG. 2, and FIG. 8B illustrates a cross-sectional view taken through line 8B-8B of FIG. 8A. The schematic of FIG. 8A includes one of the first thickness areas 60, two of the second thickness areas 62, and one of the third thickness areas 64. As noted above, each of the first, second, and third thickness areas 60, 62, 64 define different thicknesses along the crownplate 30. The first thickness area 60 defines the thinnest portion of the crownplate 30 of FIG. 8A, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 8A, the two second thickness areas 62 are entirely surrounded by the first thickness area 60, and are disposed along opposing sides of the third thickness area 64. The third thickness area 64 defines a plurality of nodes or inflection points 76, such that the boundary 70 between the third thickness area 64 and the first thickness area 60 is a wavy intersection line.

With respect to the particular thicknesses within each of the thickness areas 60, 62, 64 disclosed in FIG. 8A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.60 mm and about 0.80 mm, or between about 0.65 mm and about 0.75 mm, or about 0.70 mm. The schematic shown in FIG. 8A results in a weight savings of about 2.00 g along the crownplate 30.

Still referring to FIG. 8A, the first thickness area 60 spans all of the regions 40, 42, 44, 46, 48, 50. The second thickness areas 62 span the heel region 40, the medial region 42, the toe region 44, the central region 48, and the rear region 50. The third thickness area 64 spans all of the regions 40, 42, 44, 46, 48, 50. The third thickness area 64 includes opposing inflection points 76 that extend into the central region 48, and a central peak 78 that is centrally located and extends to the rear region 50. Portions of the first thickness area 60 extend into all nine of the sub-regions. More than 70% of each of the second thickness areas 62 are located within a medial, central subregion 80 defined by the intersection between the central region 48 and the medial region 42.

Figure 9A:
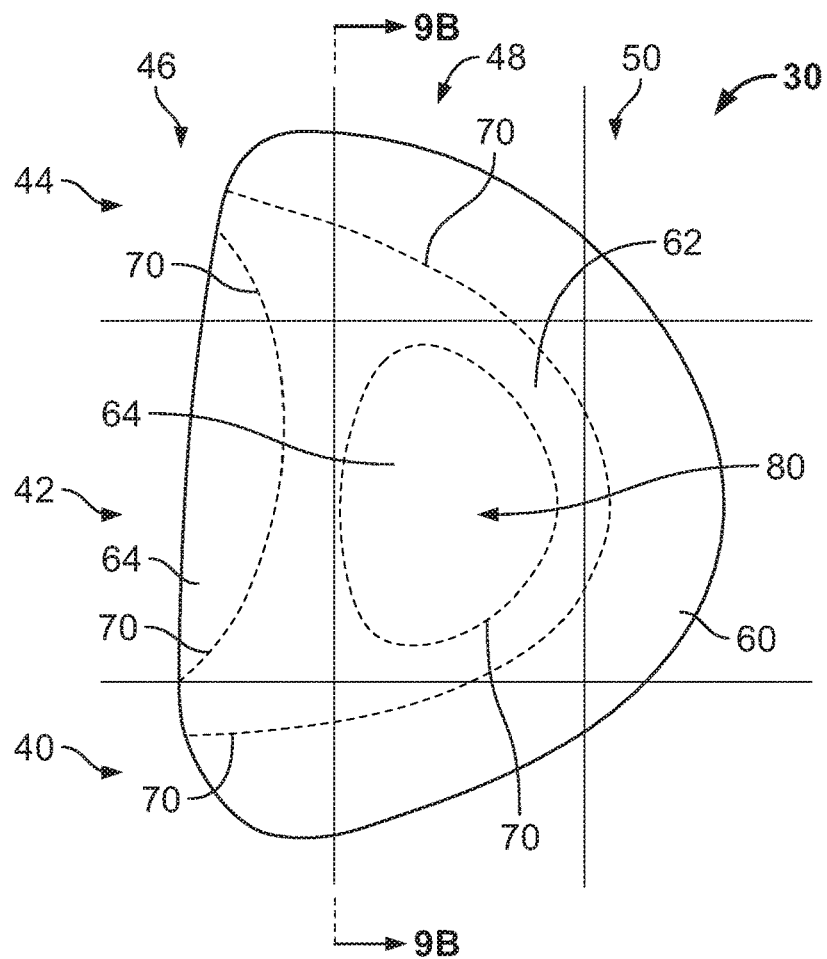
FIG. 9A is a seventh schematic view of the crown of FIG. 2.
Figure 9B:
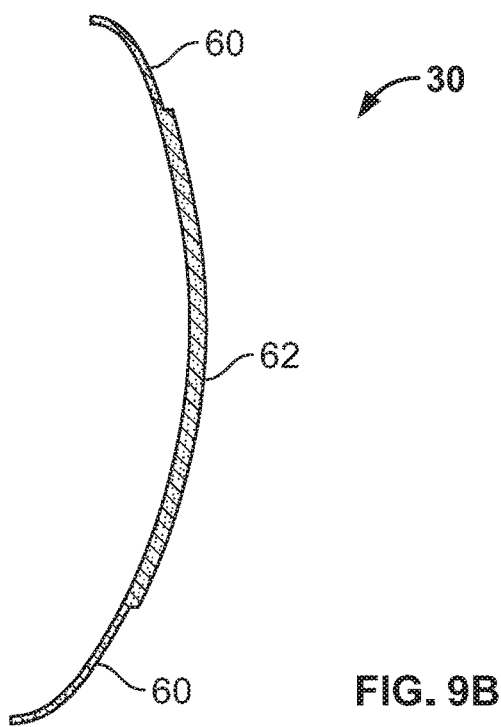
FIG. 9B is a cross-sectional view taken through line 9B-9B of FIG. 9A.

Now referring to FIG. 9A, a seventh schematic view of the crownplate 30 of FIG. 2 is depicted, and FIG. 9B illustrates a cross-sectional view taken through line 9B-9B of FIG. 9A. The schematic of FIG. 9A includes one of the first thickness areas 60, one of the second thickness areas 62, and two of the third thickness areas 64. As noted above, each of the first, second, and third thickness areas 60, 62, 64 define different thicknesses along the crownplate 30. The first thickness area 60 defines the thinnest portion of the crownplate 30 of FIG. 9A, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 9A, both of the third thickness areas 64 are surrounded entirely by the second thickness area 62. The first thickness area defines a U-shape and circumscribes a periphery of the second thickness area 62 along the boundary 70 therebetween. One of the third thickness areas 64 is centrally located along the crownplate 30, and is egg-shaped.

With respect to the particular thicknesses within each of the thickness areas 60, 62, 64 disclosed in FIG. 9A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.60 mm and about 0.80 mm, or between about 0.65 mm and about 0.75 mm, or about 0.70 mm. The schematic shown in FIG. 9A results in a weight savings of about 2.20 g along the crownplate 30 when compared with a crownplate of the same profile having a constant thickness of 0.85 mm.

Still referring to FIG. 9A, the first thickness area 60 spans all of the regions 40, 42, 44, 46, 48, 50. The second thickness area 62 also spans all of the regions 40, 42, 44, 46, 48, 50. The third thickness areas 64 span the medial region 42, the toe region 44, the front region 46, and the central region 48. One of the third thickness areas 64 is located entirely within the medial, central subregion 80 defined by a cross of the medial region 42 and the central region 48. While the third thickness area 64 is depicted as being entirely within the medial, central subregion 80, it is contemplated that the first thickness area 60 or the second thickness area 62 could be defined entirely within the medial, central subregion 80. The third thickness area 64 that is disposed entirely within the front region 46 spans only the medial region 42 and the toe region 44.

Figure 10A:
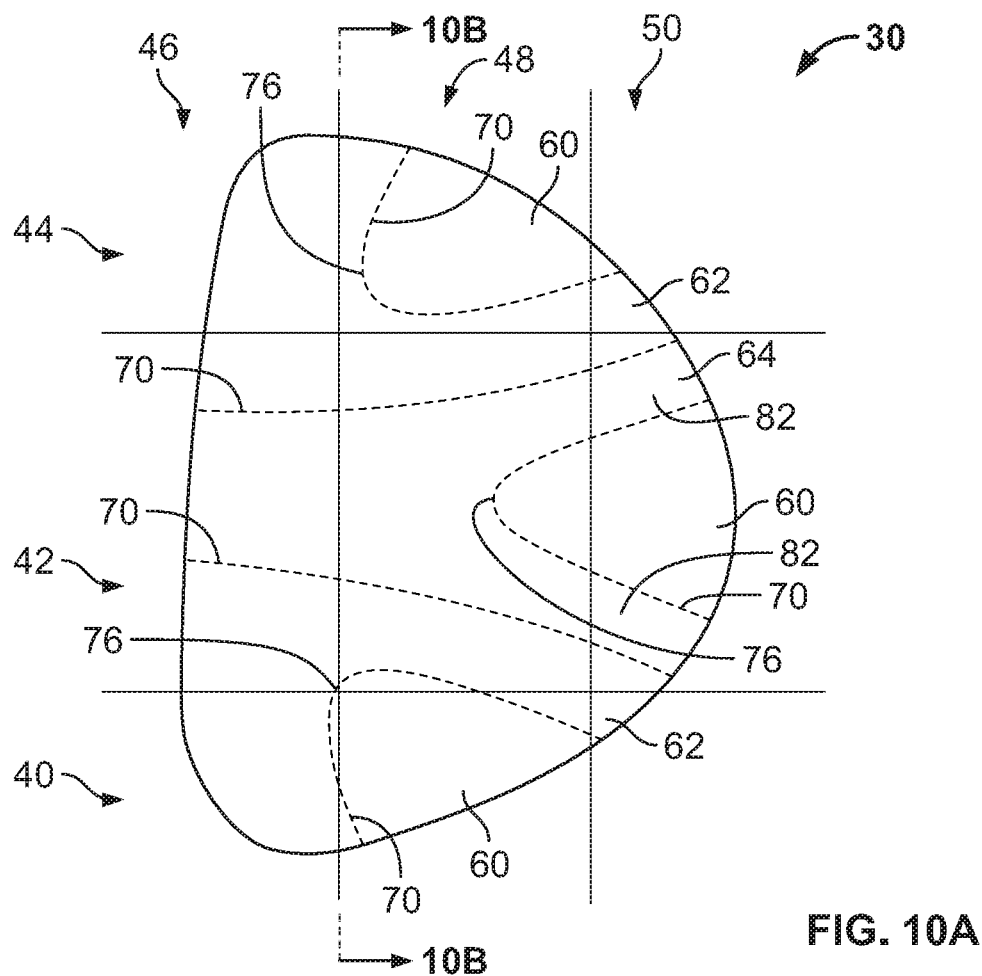
FIG. 10A is an eighth schematic view of the crown of FIG. 2.
Figure 10B:
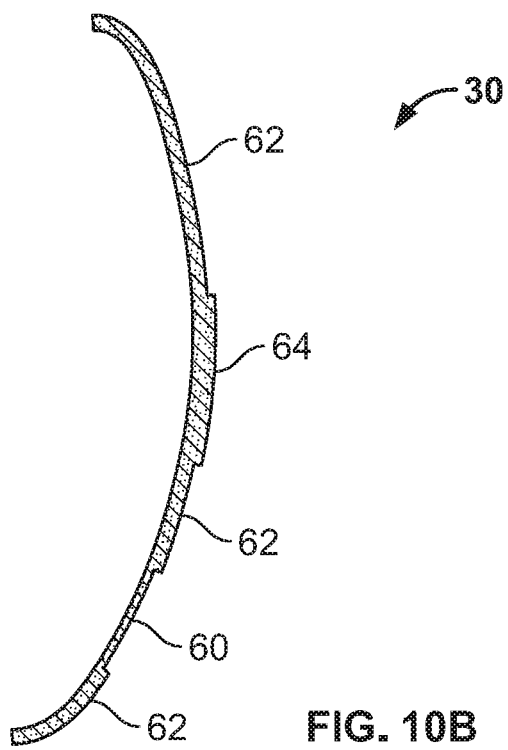
FIG. 10B is a cross-sectional view taken through line 10B-10B of FIG. 10A.

FIG. 10A is an eighth schematic view of the crownplate 30 of FIG. 2, and FIG. 10B illustrates a cross-sectional view taken through line 10B-10B of FIG. 10A. The schematic of FIG. 10A includes three of the first thickness areas 60, two of the second thickness areas 62, and one of the third thickness areas 64. As noted above, each of the first, second, and third thickness areas 60, 62, 64 define different thicknesses along the crownplate 30. The first thickness area 60 defines the thinnest portion of the crownplate 30 of FIG. 10A, while the third thickness area 64 defines the thickest portion of the crownplate 30. The second thickness area 62 is thicker than the first thickness area 60, and the third thickness area 64 is thicker than the second thickness area 62. In the particular embodiment shown in FIG. 10A, two of the first thickness areas 60 are bounded by two of the second thickness areas 62, and one of the first thickness areas 60 is bounded by the third thickness area 64. The second thickness areas 62 and the third thickness area 64 extend from the face 38 toward the rear region 50. The third thickness area 64 defines a Y-shape with arms 82 extending into the rear region 50.

With respect to the particular thicknesses within each of the thickness areas 60, 62, 64 disclosed in FIG. 10A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.60 mm and about 0.80 mm, or between about 0.65 mm and about 0.75 mm, or about 0.70 mm. The schematic shown in FIG. 10A results in a weight savings of about 1.80 g along the crownplate 30 when compared with a crownplate of the same profile having a constant thickness of 0.85 mm.

Still referring to FIG. 10A, the first thickness areas 60 span all of the regions 40, 42, 44, 46, 48, 50. The second thickness areas 62 also span all of the regions 40, 42, 44, 46, 48, 50. The third thickness area 64 is confined to the medial region 42, and further spans all of the front region 46, the central region 48, and the rear region 50. The boundaries 70 between the various areas 60, 62, 64 are generally curved, and the first thickness areas 60 define inflection points 76 such that the boundaries 70 between the first thickness areas 60, and the second and third thickness areas 62, 64 are v-shaped.

Figures 11A, 11B:
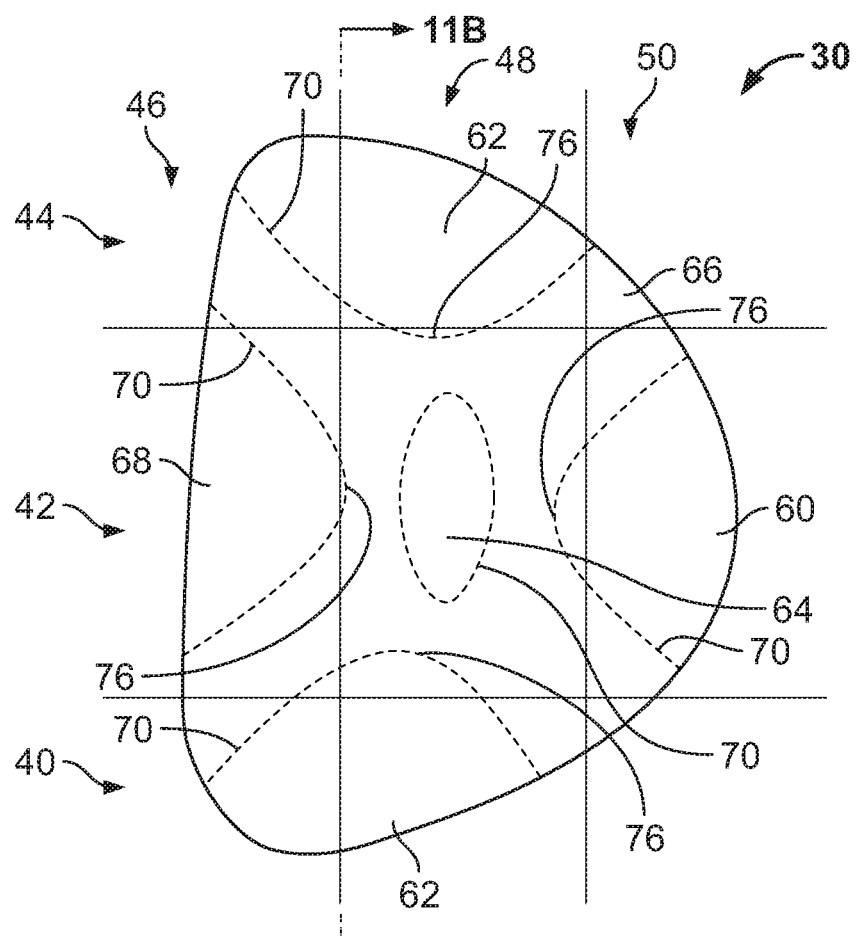
FIG. 11A is a ninth schematic view of the crown of FIG. 2.
FIG. 11B is a cross-sectional view taken through line 11B-11B of FIG. 11A.

Now referring to FIG. 11A, a ninth schematic view of the crownplate 30 of FIG. 2 is shown. FIG. 11B illustrates a cross-sectional view taken through line 11B-11B of FIG. 11A. The particular design of the crownplate 30 shown in FIG. 11A includes one of the first thickness areas 60, two of the second thickness area 62, one of the third thickness areas 64, one of the fourth thickness areas 66, and further illustrates the fifth thickness area 68. All of the first thickness area 60, the second thickness areas 62, the third thickness area 64, the fourth thickness area 66, and the fifth thickness area 68 define differing thicknesses. The first thickness area 60 defines the thinnest portion of the crownplate 30 of FIG. 11A, while the fifth thickness area 68 defines the thickest portion of the crownplate 30. The second thickness area 62 is thicker than the first thickness area 60, the third thickness area 64 is thicker than the second thickness area 62, the fourth thickness area 66 is thicker than the third thickness area 64, and the fifth thickness area 68 is thicker than the fourth thickness area 66. The first thickness area 60, the second thickness areas 62, the third thickness area 64, and the fifth thickness area 68 are each bounded by the fourth thickness area 66 along their respective boundaries 70. The fourth thickness area 66 defines an X-shape across the crownplate 30, and is centrally interrupted by the third thickness area 64. The third thickness area 64 is in the shape of a pointed oval. The first thickness area 60, the second thickness areas 62, and the fifth thickness area 68 are v-shaped and include inflection points 76.

With respect to the particular thicknesses within each of the thickness areas 60, 62, 64, 66, 68 disclosed in FIG. 11A, the first thickness area 60 defines a thickness of between about 0.40 mm and about 0.60 mm, or between about 0.45 mm and about 0.55 mm, or about 0.50 mm. The second thickness area 62 defines a thickness of between about 0.45 mm and about 0.65 mm, or between about 0.50 mm and about 0.60 mm, or about 0.55 mm. The third thickness area 64 defines a thickness of between about 0.50 mm and about 0.70 mm, or between about 0.55 mm and about 0.65 mm, or about 0.60 mm. The fourth thickness area 66 defines a thickness of between about 0.55 mm and about 0.75 mm, or between about 0.60 mm and about 0.70 mm, or about 0.65 mm. The fifth thickness area 68 defines a thickness of between about 0.65 mm and about 0.85 mm, or between about 0.70 mm and about 0.80 mm, or about 0.75 mm. The schematic shown in FIG. 11A results in a weight savings of about 2.60 g along the crownplate 30 when compared with a crownplate of the same profile having a constant thickness of 0.85 mm.

Still referring to FIG. 11A, the first thickness areas 60 spans the medial region 42, the central region 48, and the rear region 50. The second thickness areas span all of the regions 40, 42, 44, 46, 48, 50. The third thickness area spans the medial region 42 and the central region 48, and is disposed entirely within the medial, central subregion 80. The fourth thickness area 66 spans all of the regions 40, 42, 44, 46, 48, 50. The fifth thickness area 68 spans the medial region 42, the toe region 44, the front region 46, and the central region 48. The third thickness area 64 is in the shape of a pointed oval, and each of the first thickness area 60, the second thickness areas 62, and the fifth thickness area 68 define inflection points 76 that are disposed interior to an outer periphery of the crownplate 30.

Figure 12A:
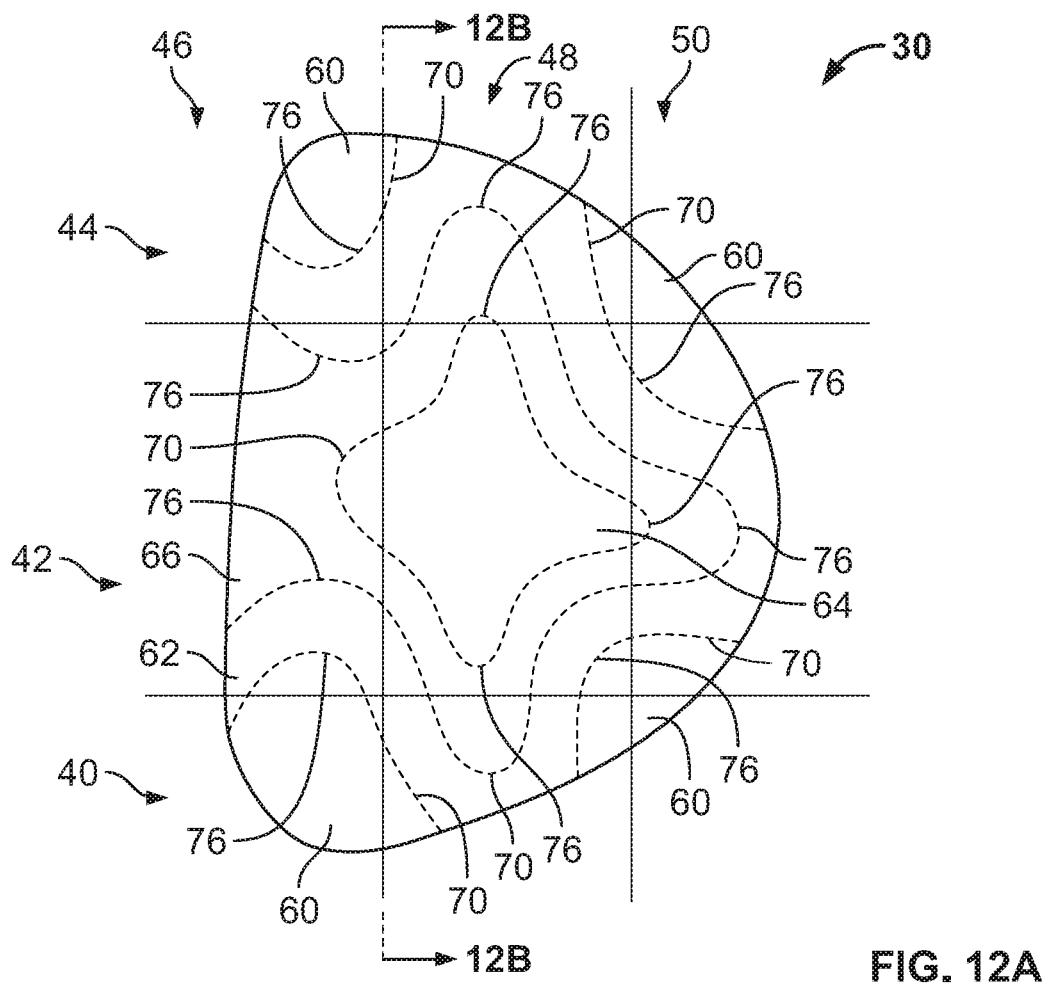
FIG. 12A is a tenth schematic view of the crown of FIG. 2.
Figure 12B:
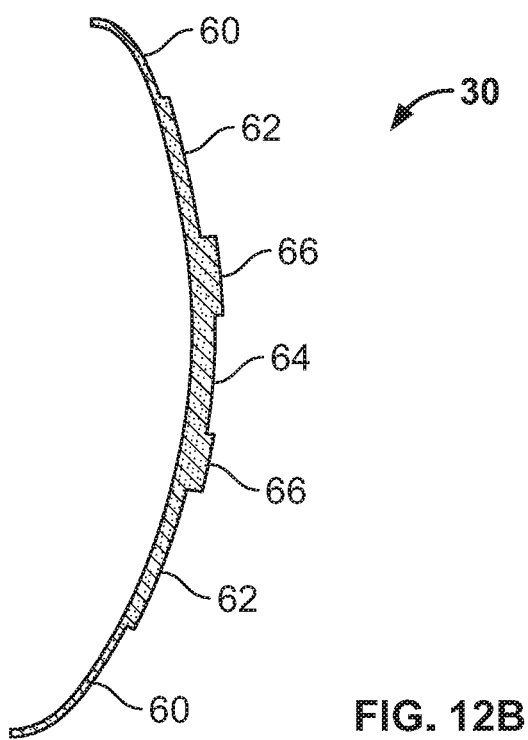
FIG. 12B is a cross-sectional view taken through line 12B-12B of FIG. 12A.

FIG. 12A is a tenth schematic view of the crownplate 30 of FIG. 2, and FIG. 12B illustrates a cross-sectional view taken through line 12B-12B of FIG. 12A. The particular design of the crownplate 30 shown in FIG. 12A includes four of the first thickness areas 60, one of the second thickness area 62, one of the third thickness areas 64, and one of the fourth thickness areas 66. All of the first thickness area 60, the second thickness areas 62, the third thickness area 64, and the fourth thickness area 66 define differing thicknesses. The first thickness area 60 defines the thinnest portion of the crownplate 30 of FIG. 12A, while the fourth thickness area 66 defines the thickest portion of the crownplate 30. The second thickness area 62 is thicker than the first thickness area 60, the third thickness area 64 is thicker than the second thickness area 62, and the fourth thickness area 66 is thicker than the third thickness area 64. The first thickness areas 60 are bounded by the second thickness area 62, the second thickness area 62 defines a boundary 70 with the fourth thickness area 66, and the fourth thickness area 66 is centrally interrupted by the third thickness area 64.

With respect to the particular thicknesses within each of the thickness areas 60, 62, 64, 66 disclosed in FIG. 12A, the first thickness area 60 defines a thickness of between about 0.40 mm and about 0.60 mm, or between about 0.45 mm and about 0.55 mm, or about 0.50 mm. The second thickness area 62 defines a thickness of between about 0.50 mm and about 0.70 mm, or between about 0.55 mm and about 0.65 mm, or about 0.60 mm. The third thickness area 64 defines a thickness of between about 0.55 mm and about 0.75 mm, or between about 0.60 mm and about 0.70 mm, or about 0.65 mm. The fourth thickness area 66 defines a thickness of between about 0.65 mm and about 0.85 mm, or between about 0.70 mm and about 0.80 mm, or about 0.75 mm. The schematic shown in FIG. 12A results in a weight savings of about 2.30 g along the crownplate 30 when compared against a crownplate of the same profile having a constant thickness of 0.85 mm.

Still referring to FIG. 12A, the first thickness areas 60 span all of the regions 40, 42, 44, 46, 48, 50. The second thickness area 62 also spans all of the regions 40, 42, 44, 46, 48, 50. The third thickness area spans the medial region 42, the toe region 44, the front region 46, the central region 48, and the rear region 50. The fourth thickness area spans all of the regions 40, 42, 44, 46, 48, 50. Each of the second thickness area 62, the third thickness area 64, and the fourth thickness area 66 define undulating boundaries 70 with neighboring thickness areas. The third thickness area 64 defines four of the inflection points 76 along its periphery, the fourth thickness area 66 defines seven of the inflection points 76 along the boundary 70 with the second thickness area 62, and each of the first thickness areas 60 define inflection points 76 such that the first thickness areas 60 are generally u- or v-shaped.

Figure 13A:
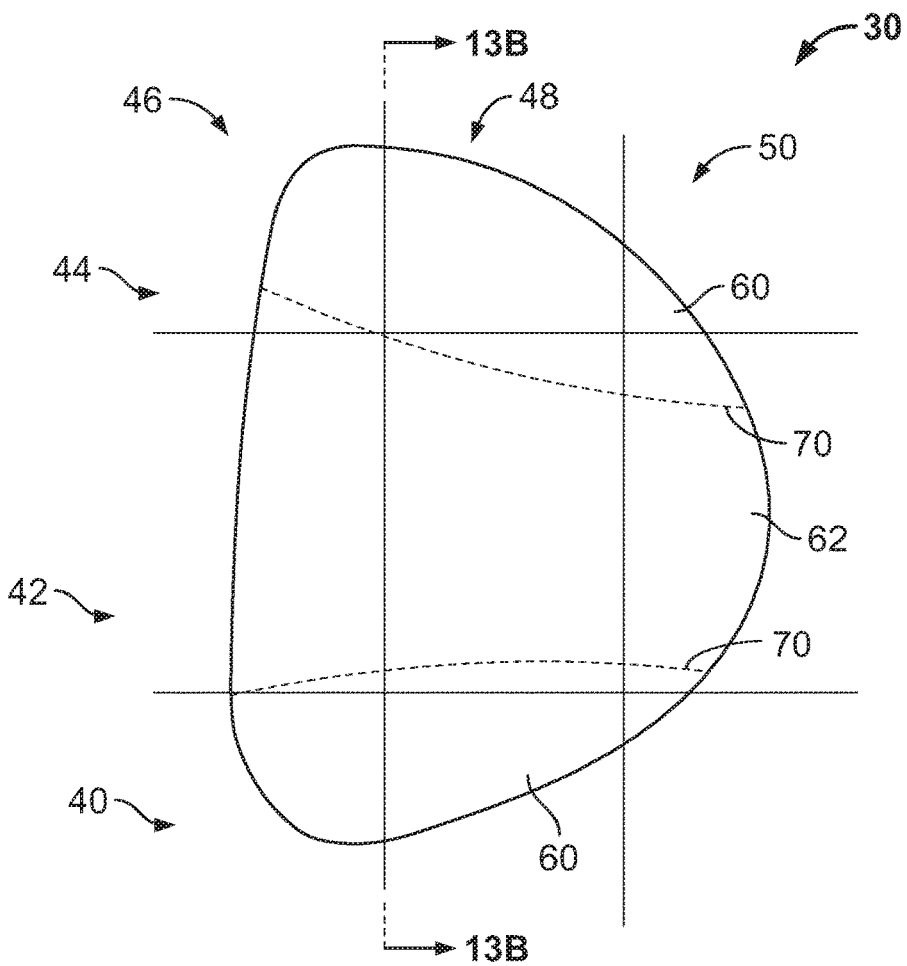
FIG. 13A is a tenth schematic view of the crown of FIG. 2.
Figure 13B:
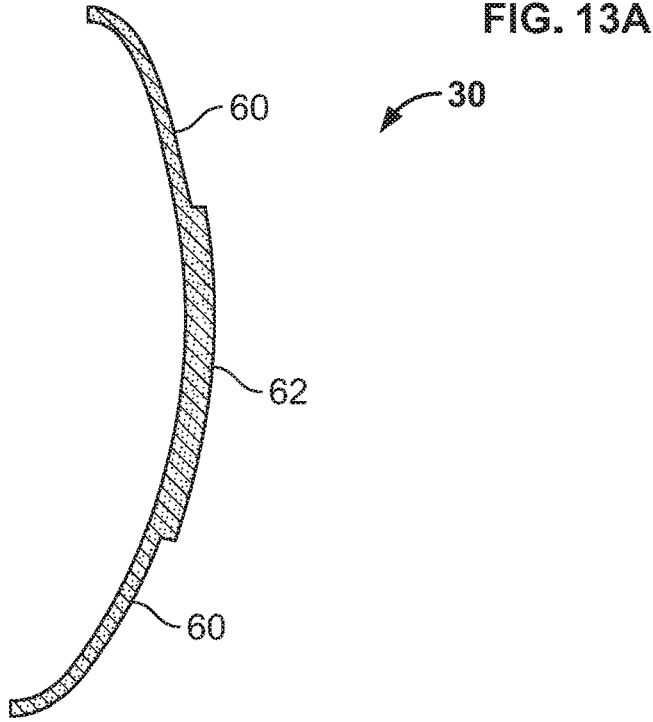
FIG. 13B is a cross-sectional view taken through line 13B-13B of FIG. 13A.

Now referring to FIG. 13A, an eleventh schematic view of the crownplate 30 of FIG. 2 is shown. FIG. 13B illustrates a cross-sectional view taken through line 7B-7B of FIG. 7A. The schematic of FIG. 13A includes two of the first thickness areas 60 and one of the second thickness areas 62. As noted above, each of the first and second thickness areas 60, 62 define different thicknesses along the crownplate 30. The first thickness area 60 defines the thinnest portion of the crownplate 30 of FIG. 13A, while the second thickness area 62 defines the thickest portion of the crownplate 30, i.e., the second thickness area 62 is thicker than the first thickness area 60. In the particular embodiment shown in FIG. 13A, the second thickness area 62 is disposed between the two first thickness areas 60.

With respect to the particular thicknesses within each of the thickness areas 60, 62 disclosed in FIG. 13A, the first thickness area 60 defines a thickness of between about 0.45 mm and about 0.65 mm, or between about 0.50 mm and about 0.60 mm, or about 0.55 mm. The second thickness area 62 defines a thickness of between about 0.65 mm and about 0.85 mm, or between about 0.70 mm and about 0.80 mm, or about 0.75 mm. The schematic shown in FIG. 13A results in a weight savings of about 1.65 g along the crownplate 30 when compared with a crownplate of the same profile having a constant thickness of 0.75 mm.

Still referring to FIG. 13A, the first thickness areas 60 span all of the regions 40, 42, 44, 46, 48, 50, while the second thickness area spans the regions 42, 44, 46, 48, 50. The first thickness areas 60 are disposed along peripheries of the heel region 40 and the toe region 44 and intersect with the second thickness area 62 along bowed boundaries 70 that are disposed at least partially within the medial region 42. The second thickness area 62 is disposed entirely between the first thickness areas 60. The second thickness area 62 defines a narrowing, wasted region moving from the front region 46 to the rear region 50. The second thickness area 62 that spans the toe region 44 is larger than the second thickness area 62 that spans the heel region 40. The boundaries 70 between each of the thickness areas 60, 62 are curved or bowed.

Figure 14A:
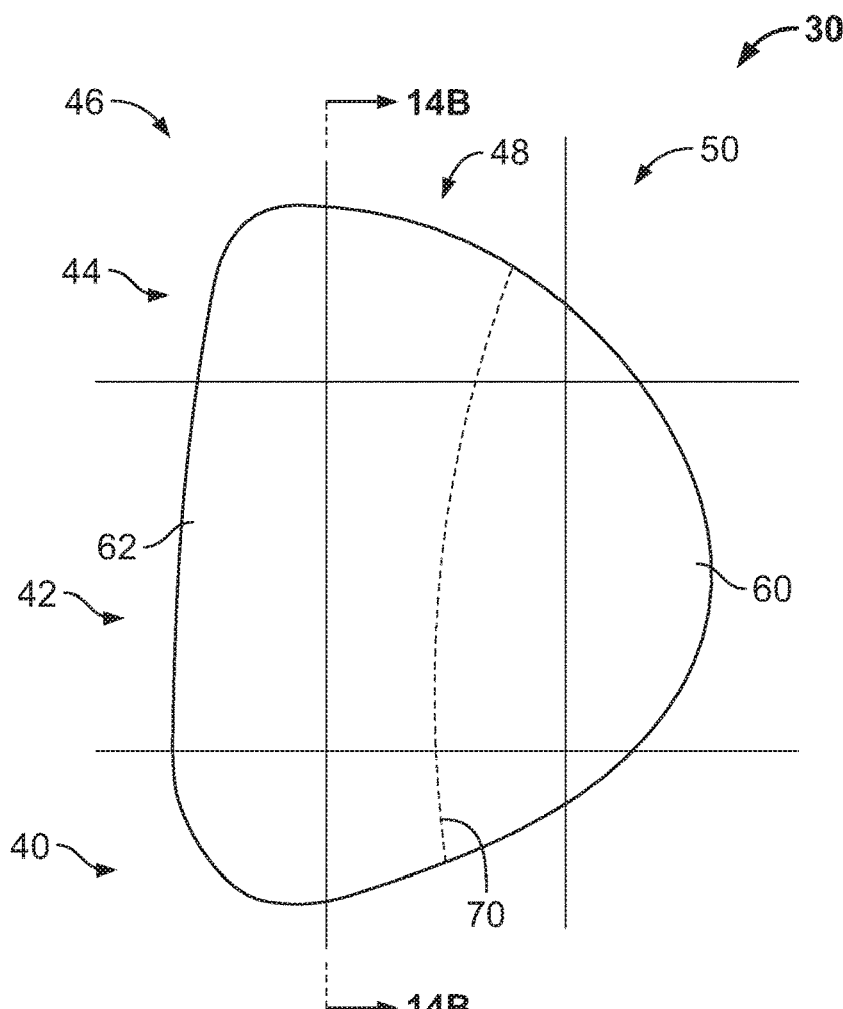
FIG. 14A is an eleventh schematic view of the crown of FIG. 2.
Figure 14B:
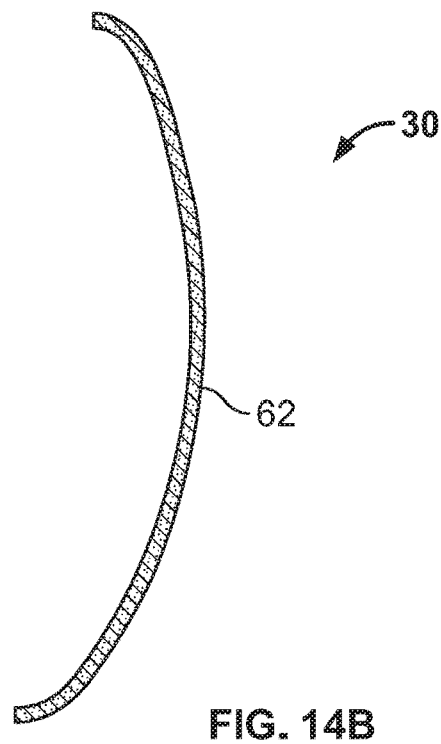
FIG. 14B is a cross-sectional view taken through line 14B-14B of FIG. 14A.

Now referring to FIG. 14A, a twelfth schematic view of the crownplate 30 of FIG. 2 is shown. FIG. 14B illustrates a cross-sectional view taken through line 14B-14B of FIG. 14A. The schematic of FIG. 14A includes one of the first thickness areas 60 and one of the second thickness areas 62. As noted above, each of the first and second thickness areas 60, 62 define different thicknesses along the crownplate 30. The first thickness area 60 defines the thinnest portion of the crownplate 30 of FIG. 14A, while the second thickness area 62 defines the thickest portion of the crownplate 30, i.e., the second thickness area 62 is thicker than the first thickness area 60. In the particular embodiment shown in FIG. 14A, the second thickness area 62 is disposed within the front region 46 and the medial region 48, while the first thickness area 60 is disposed within the rear region 50 and the medial region 48.

With respect to the particular thicknesses within each of the thickness areas 60, 62 disclosed in FIG. 14A, the first thickness area 60 defines a thickness of between about 0.55 mm and about 0.75 mm, or between about 0.60 mm and about 0.70 mm, or about 0.65 mm. The second thickness area 62 defines a thickness of between about 0.75 mm and about 0.95 mm, or between about 0.80 mm and about 0.90 mm, or about 0.85 mm. The schematic shown in FIG. 14A results in a weight savings of about 1.40 g along the crownplate 30 when compared with a crownplate of the same profile having a constant thickness of 0.85 mm.

Still referring to FIG. 14A, the first thickness area 60 spans the regions 42, 44, 46, 48, 50, while the second thickness area spans the regions 40, 42, 44, 46, 48. The first thickness area 60 is disposed along the entire rear region 60, while the second thickness area 62 is disposed along the entire front region 46. The first thickness area 60 and the second thickness area 62 intersect along one boundary 70 that is disposed entirely within the medial region 48. The boundary 70 is concavely bowed from the heel region 40 to the toe region 44. The second thickness area 62 is larger in surface area than the first thickness area 60.

Figure 15A:
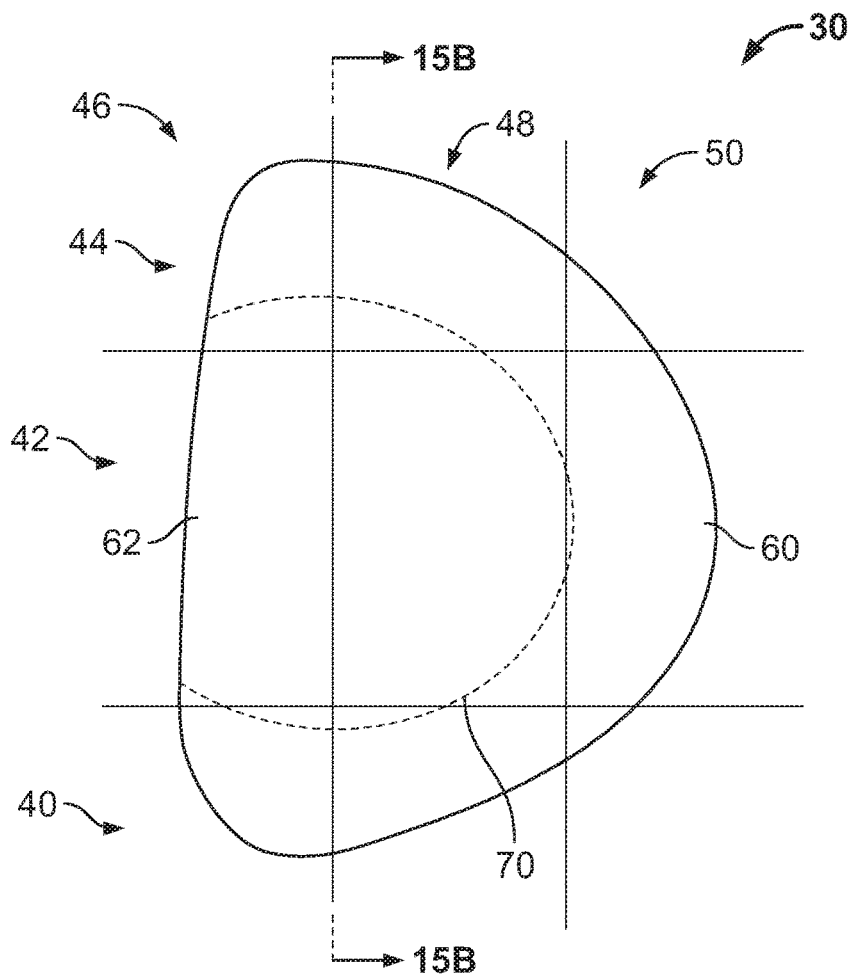
FIG. 15A is a twelfth schematic view of the crown of FIG. 2.
Figure 15B:
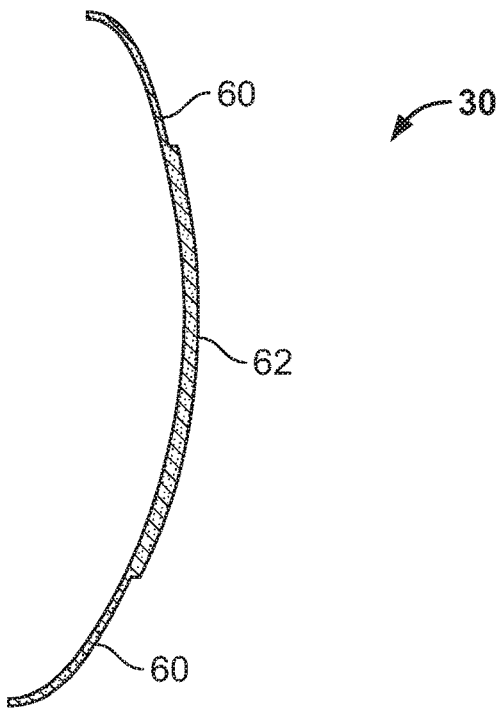
FIG. 15B is a cross-sectional view taken through line 15B-15B of FIG. 15A.

Now referring to FIG. 15A, a thirteenth schematic view of the crownplate 30 of FIG. 2 is shown. FIG. 15B illustrates a cross-sectional view taken through line 15B-15B of FIG. 15A. The schematic of FIG. 15A includes one of the first thickness areas 60 and one of the second thickness areas 62. As noted above, each of the first and second thickness areas 60, 62 define different thicknesses along the crownplate 30. The first thickness area 60 defines the thinnest portion of the crownplate 30 of FIG. 15A, while the second thickness area 62 defines the thickest portion of the crownplate 30, i.e., the second thickness area 62 is thicker than the first thickness area 60. In the particular embodiment shown in FIG. 15A, the second thickness area 62 is centrally disposed interior to first thickness areas 60. Portions of the boundary 70 at the intersection between the first thickness area 60 and the second thickness area 62 define a circle.

With respect to the particular thicknesses within each of the thickness areas 60, 62 disclosed in FIG. 15A, the first thickness area 60 defines a thickness of between about 0.55 mm and about 0.75 mm, or between about 0.60 mm and about 0.70 mm, or about 0.65 mm. The second thickness area 62 defines a thickness of between about 0.70 mm and about 0.90 mm, or between about 0.75 mm and about 0.85 mm, or about 0.80 mm. The schematic shown in FIG. 15A results in a weight savings of about 1.40 g along the crownplate 30 when compared with a crownplate of the same profile having a constant thickness of 0.80 mm.

Still referring to FIG. 15A, the first thickness area 60 spans all of the regions 40, 42, 44, 46, 48, 50, while the second thickness area spans the regions 42, 44, 46, 48. The first thickness area 60 is disposed along peripheries of the heel region 40 and the toe region 44, and surrounds the second thickness area 62 along bowed boundary 70. The second thickness area 62 extends to a periphery of the front region 46, but is otherwise surrounded by the first thickness area 60. The second thickness area 62 defines a generally circular area. The second thickness area 62 does not define an entire circle; rather, only a partial circle is defined by the second thickness area 62. The boundary 70 that is between the thickness areas 60, 62 is curved.

Figure 16A:
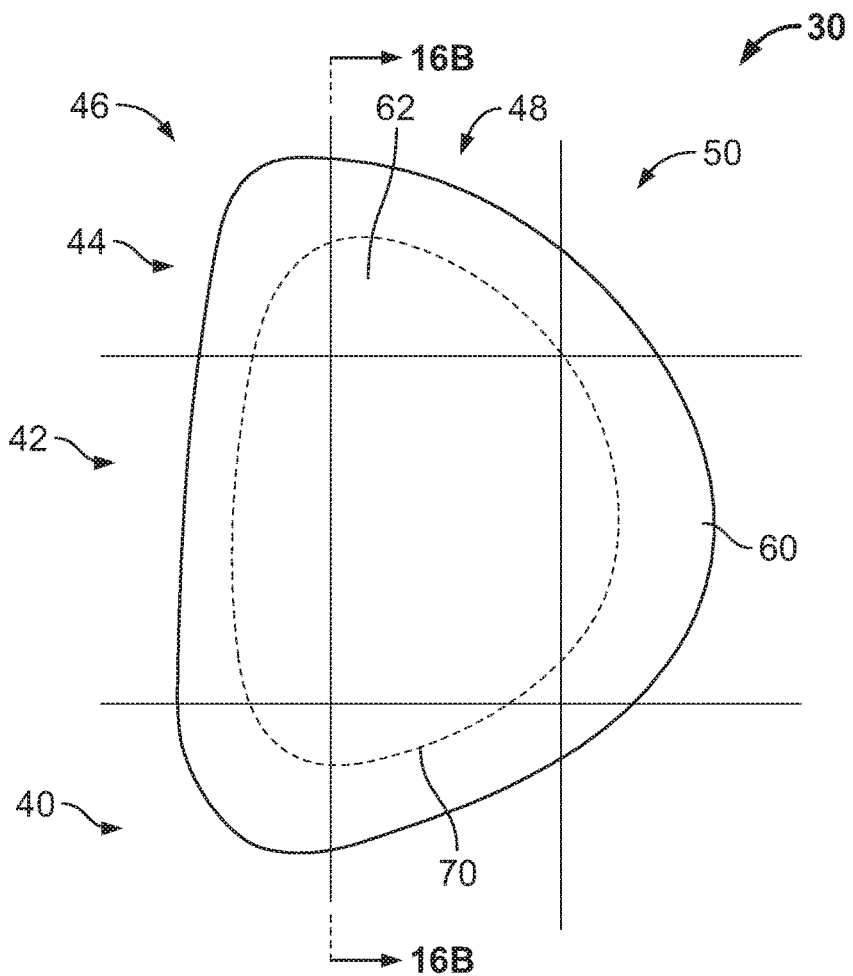
FIG. 16A is a thirteenth schematic view of the crown of FIG. 2.
Figure 16B:
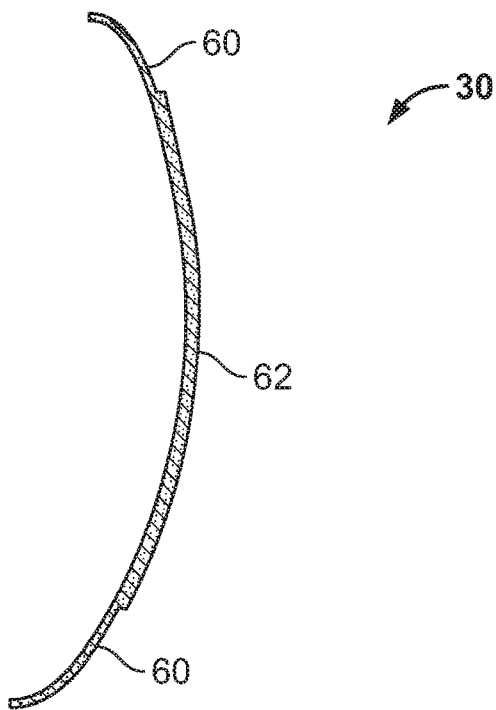
FIG. 16B is a cross-sectional view taken through line 16B-16B of FIG. 16A.

Now referring to FIG. 16A, a fourteenth schematic view of the crownplate 30 of FIG. 2 is shown. FIG. 16B illustrates a cross-sectional view taken through line 16B-16B of FIG. 16A. The schematic of FIG. 16A includes one of the first thickness areas 60 and one of the second thickness areas 62. As noted above, each of the first and second thickness areas 60, 62 define different thicknesses along the crownplate 30. The first thickness area 60 defines the thinnest portion of the crownplate 30 of FIG. 16A, while the second thickness area 62 defines the thickest portion of the crownplate 30, i.e., the second thickness area 62 is thicker than the first thickness area 60. In the particular embodiment shown in FIG. 16A, the second thickness area 62 is centrally disposed along the crownplate 30, and is entirely surrounded by the first thickness area 60.

With respect to the particular thicknesses within each of the thickness areas 60, 62 disclosed in FIG. 16A, the first thickness area 60 defines a thickness of between about 0.45 mm and about 0.65 mm, or between about 0.50 mm and about 0.60 mm, or about 0.55 mm. The second thickness area 62 defines a thickness of between about 0.60 mm and about 0.80 mm, or between about 0.65 mm and about 0.75 mm, or about 0.70 mm. The schematic shown in FIG. 16A results in a weight savings of about 1.30 g along the crownplate 30 when compared with a crownplate of the same profile having a constant thickness of 0.70 mm. Both the first thickness area 60 and the second thickness area span all of the regions 40, 42, 44, 46, 48, 50, along with all of the subregions. The first thickness area 60 is disposed along an entire periphery of the crownplate 30, and the second thickness area 62 is disposed completely interior to the entire first thickness area 60.

Figure 17A:
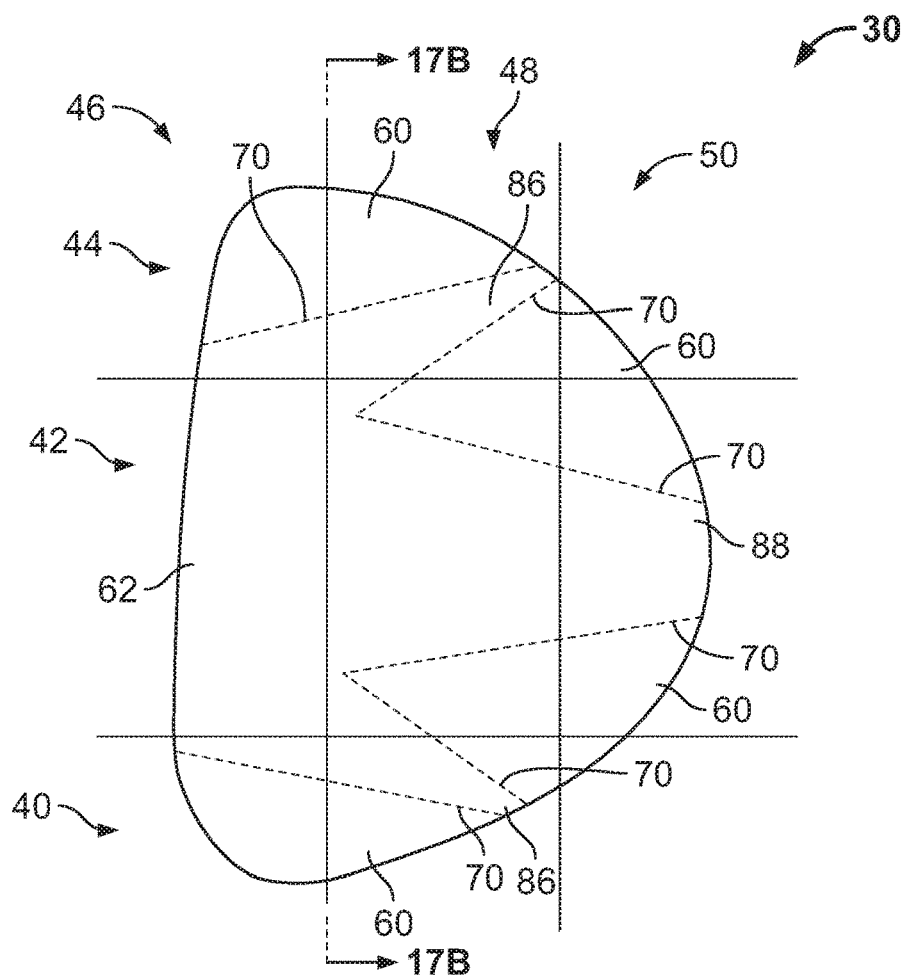
FIG. 17A is a fourteenth schematic view of the crown of FIG. 2.
Figure 17B:
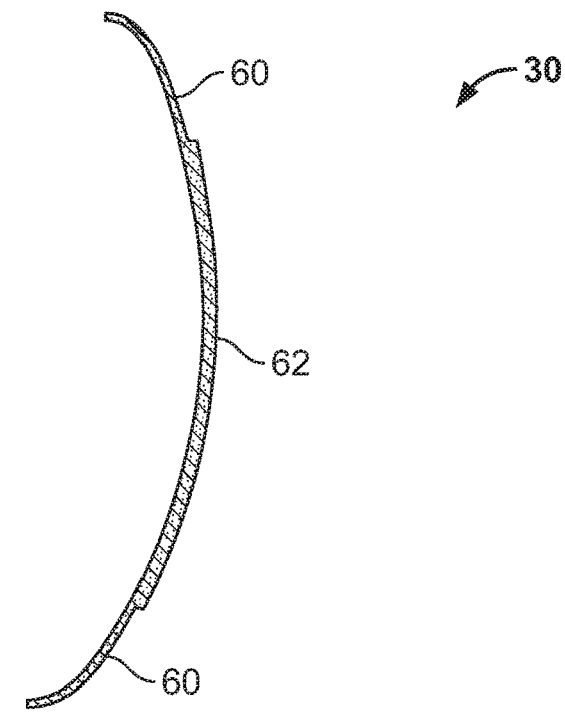
FIG. 17B is a cross-sectional view taken through line 17B-17B of FIG. 17A.

Now referring to FIG. 17A, a fifteenth schematic view of the crownplate 30 of FIG. 2 is shown. FIG. 17B illustrates a cross-sectional view taken through line 17B-17B of FIG. 17A. The schematic of FIG. 17A includes four of the first thickness areas 60 and one of the second thickness areas 62. As noted above, each of the first and second thickness areas 60, 62 define different thicknesses along the crownplate 30. The first thickness area 60 defines the thinnest portion of the crownplate 30 of FIG. 17A, while the second thickness area 62 defines the thickest portion of the crownplate 30, i.e., the second thickness area 62 is thicker than the first thickness area 60. In the particular embodiment shown in FIG. 17A, the second thickness area 62 defines regions that separate the first thickness areas 60.

With respect to the particular thicknesses within each of the thickness areas 60, 62 disclosed in FIG. 17A, the first thickness area 60 defines a thickness of between about 0.50 mm and about 0.70 mm, or between about 0.55 mm and about 0.65 mm, or about 0.60 mm. The second thickness area 62 defines a thickness of between about 0.70 mm and about 0.90 mm, or between about 0.75 mm and about 0.85 mm, or about 0.80 mm. The schematic shown in FIG. 17A results in a weight savings of about 1.60 g along the crownplate 30 when compared with a crownplate of the same profile having a constant thickness of 0.80 mm.

Still referring to FIG. 17A, the first thickness areas 60 span all of the regions 40, 42, 44, 46, 48, 50, and the second thickness area also spans all of the regions 40, 42, 44, 46, 48, 50. The first thickness areas 60 are disposed along peripheries of the heel region 40 and the toe region 44 and intersect with the second thickness area 62 along straight or linear boundaries 70 that extend at varying angles with respect to one another. The second thickness area 62 defines two narrowing portions 86 along the heel and toe sides thereof, and a central narrowing portion 88 that is centrally located along the crownplate 30. The narrowing portions 86, 88 become narrower moving from the front region 46 to the rear region 50.

Referring now to FIGS. 18-22, various layering sequences of the crownplate 30 are illustrated, which further include individual pre-preg plies 90 having varying strength ratings and that have differing fiber orientations. The fiber orientations of each of plies 90 that are "unidirectional" are so disposed since optimum strength and stiffness is achieved in composite fibers by aligning the fibers parallel with respect to one another. Providing plies along any composite part that have different composite fiber orientations can increase the strength of the composite, as is known in the art. While the embodiments of FIGS. 18-22 include various combinations of plies 90 having different strength characteristics, it is contemplated that the plies 90 may have the same strength characteristics. Still further, while the plies 90 are shown having particular fiber orientations, alternative fiber orientations are possible and fall within the scope of the present disclosure. Unless the plies 90 are specified as having multiple fiber orientations, the plies 90 should be construed as having unidirectional fiber orientations.

The embodiments depicted within FIGS. 18-22 illustrate alternative constructions of the crownplate 30, wherein partial plies of higher strength ratings and full plies of standard strength ratings are combined to create crownplates 30 having regions of varying thickness. These examples illustrate relative size differences and designs between the high-strength and standard-strength prepreg sheets or plies 90 shown therein. While the depicted embodiments are illustrative, alternative combinations are contemplated related to varying ply orientation, number of plies, stacking order, panel thickness ranges, ply thickness ranges, strength ratings, and curvatures of the panel being made to help reduce weight, add structural integrity for increased durability, manage cost, and improve the performance of the club head 22. In these examples, an exterior or external ply 92 comprises a weave construction for aesthetic and/or durability purposes. While the external ply 92 is shown comprising a weave construction, i.e., a weave of plies having a 90° orientation and 0° orientation, it is contemplated that the external ply 92 may have alternative constructions, and may comprise a unidirectional ply rather than a weave of plies in multiple directions. In some embodiments, it may be desirable to use a unidirectional prepreg ply for the external ply 92. In some embodiments, the external ply 92 is painted or covered with a decal, which can negate a need for a twill exterior ply since the weave pattern is not visible to the golfer.

The layup examples of FIGS. 18-22 illustrate variations of the clubhead 22 that includes the crownplate 30 having regions that have been thickened by inserting high-strength prepreg plies into the layup process. In some embodiments, the various embodiments illustrate an order of insertion of the plies into the mold, e.g., beginning with the first or external ply 92, and adding a second, third, fourth, fifth, sixth, and seventh ply into the mold on top of the external ply 92. To that end, the various embodiments depict the external ply 92 being inserted first, various intermediate plies 94 being inserted after the external ply 92, and an interior ply 96 being inserted last. While each of the embodiments of FIGS. 18-22 illustrates five of the internal plies 94, it is contemplated that the number of intermediate plies 94 may vary in number due to thickness and durability requirements. In some embodiments, only the exterior ply 92 and the interior ply 96 are included, without any of the intermediate plies 94.

The embodiments of FIGS. 18-22 result in strengthened regions along the club head 22, as shown along the club head 22 depicted in the diagrams of FIGS. 18-22, which are the result of the various layup sequences depicted in the figures. It should be noted that the club head 22 can be formed in such a way that the buildup of the plies 90 extends inward, toward an interior cavity of the club head 22 so that an exterior surface thereof remains smooth, with no outward indication of the localized regions where high-strength plies have been added to the crownplate 30. In some embodiments, the strengthened regions 98 can extend outward where the thickness changes are visible to the golfer. In still other embodiments, the strengthened regions 98 may be varied such that some thickness changes protrude outwardly and some protrude inwardly. A shape of the machined volume in the mold will determine how these distinct and explicit thickened regions will be made for cosmetic and/or strength needs. Each of the strengthened regions 98 are defined by boundaries 100 that separate the strengthened regions 98 from standard regions 102, i.e., portions of the crownplate 30 that are only defined by the plies 90 that are "full" rather than "partial" plies. Thickened portions are created by the addition of partial plies, and the embodiments disclosed below may define thickened portions in a similar fashion as described above with respect to FIGS. 3A-17B.

Figure 18:
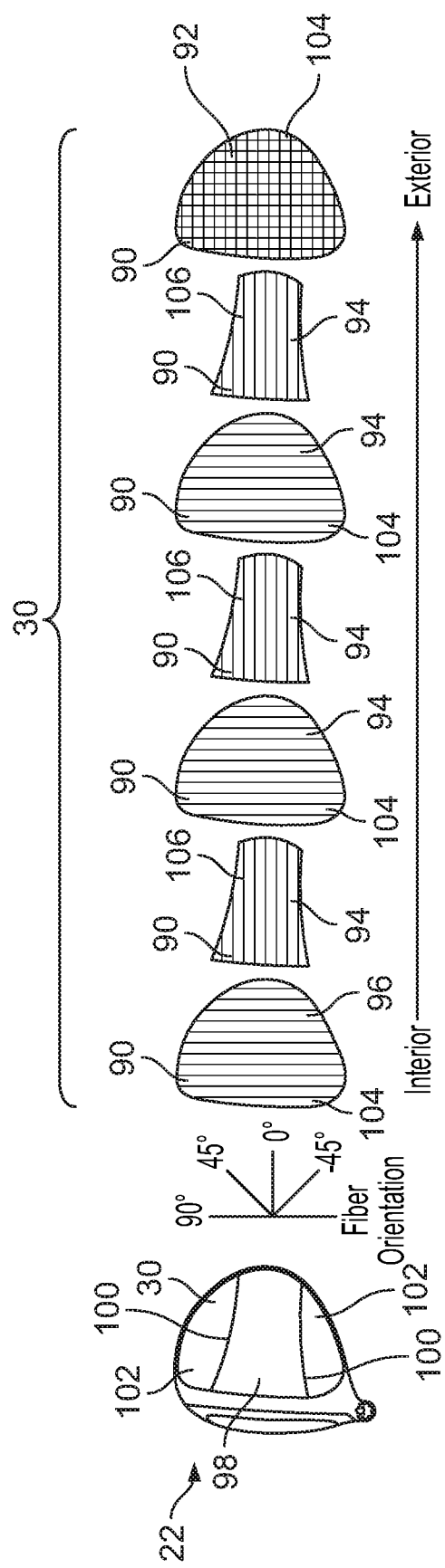
FIG. 18 illustrates a layering sequence of a first embodiment of a crownplate implementing alternative strength plies.

Referring to FIG. 18, a first layup sequence is shown. The layup sequence of FIG. 18 includes standard strength plies 104 and high strength plies 106. All of the high strength plies 106 are also intermediate plies 94. The exterior ply 92 is a weave ply having fibers at both a 0° and 90° orientation. The intermediate plies 94 alternate between standard strength plies 104 and high strength plies 106. The standard strength plies 104 are full plies, while the high strength plies 106 are partial plies, the combination of which defines a similar profile as the thickened regions depicted in FIGS. 13A and 13B. Each of the standard strength plies 104 of FIG. 18 includes a 90° fiber orientation, while each of the high strength plies 106 includes a 0° orientation. The layup sequence of FIG. 18 results in a weight savings of approximately 1.70 g compared to a crownplate 30 that comprises all standard strength plies 104, i.e., none of the partial, high strength plies 106.

Figure 19:
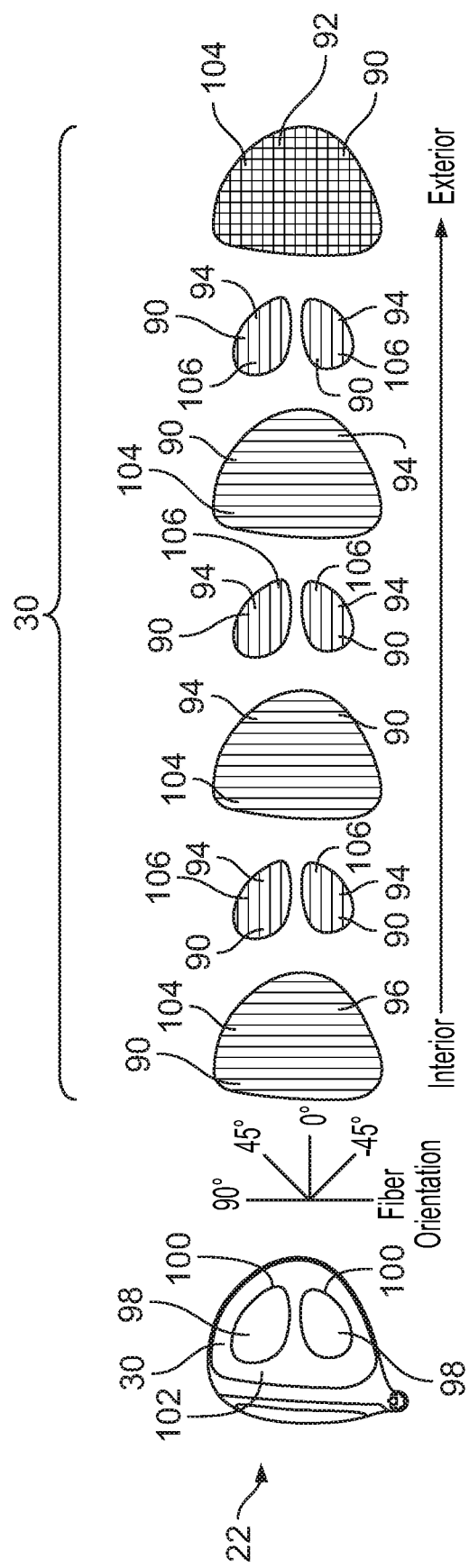
FIG. 19 illustrates a layering sequence of a second embodiment of a crownplate implementing alternative strength plies.

Now referring to FIG. 19, a second layup sequence is shown. The layup sequence of FIG. 19 includes the standard strength plies 104 and the high strength plies 106. All of the high strength plies 106 are also intermediate plies 94. Further, within each layer, the high strength plies 106 are spaced apart from one another, forming two separate egg-shaped high strength plies 106. The exterior ply 92 is a weave ply having fibers at both a 0° and 90° orientation. The intermediate plies 94 alternate between the standard strength plies 104 and the high strength plies 106. The standard strength plies 104 are full plies, while the high strength plies 106 are partial plies, the combination of which defines a similar profile as the thickened regions depicted in FIGS. 6A and 6B. Each of the standard strength plies 104 of FIG. 19 includes a 90° fiber orientation, while each of the high strength plies 106 includes a 0° orientation. The layup sequence of FIG. 19 results in a weight savings of approximately 2.50 g compared to a crownplate 30 that comprises all standard strength plies 104.

Figure 20:
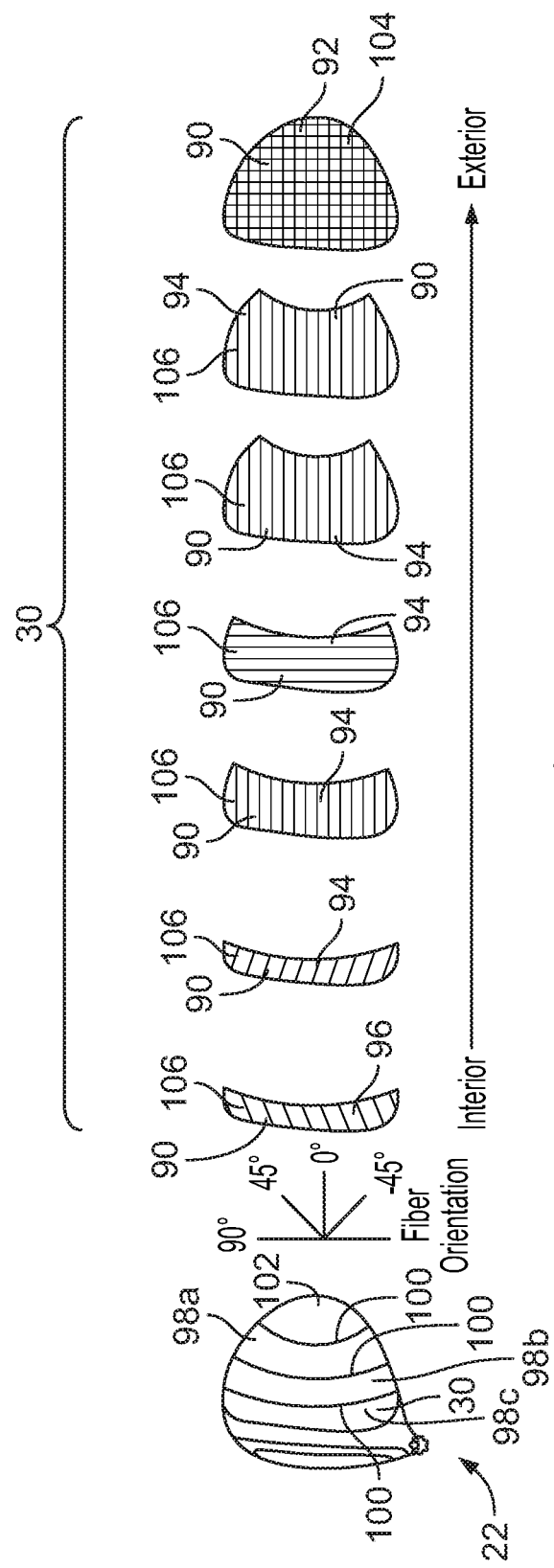
FIG. 20 illustrates a layering sequence of a third embodiment of a crownplate implementing alternative strength plies.

Referring to FIG. 20, a third layup sequence is shown. The layup sequence of FIG. 20 includes only one of the standard strength plies 104, and the remaining plies are the high strength plies 106. The interior ply 96 and all of the intermediate plies 94 are the high strength plies 106, while the exterior ply 92 is the standard strength ply 104. The interior ply 96 and all of the intermediate plies 94 are also partial plies, while the sole standard strength ply 104 is a full-sized ply. The interior ply 96 has a ply orientation of 45°, while the intermediate ply 94 positioned adjacent the interior ply 96 has a ply orientation of −45°. The next two intermediate plies 94 have ply orientations of 0° and 90°, respectively, while the final two intermediate plies 94 that are positioned adjacent the exterior ply 92 have ply orientations of 0°. After the layup process, the club head 22 of FIG. 20 results in a first strengthened region 98a, a second strengthened region 98b, and a third strengthened region 98c, due to the differing shapes of the intermediate plies 94 as compared with one another. As a result, the interior ply 96 defines a first sized ply, the intermediate plies 94 define second and a third sized plies, and the exterior ply 92 defines a fourth sized ply, the first, second, third, and fourth sized plies defining different sizes. The plies 90 of FIG. 20 define thickness regions that are similar in profile to the thickness regions of FIG. 5A. The layup sequence of FIG. 20 results in a weight savings of approximately 2.60 g compared to a crownplate 30 that comprises all standard strength plies 104.

Figure 21:
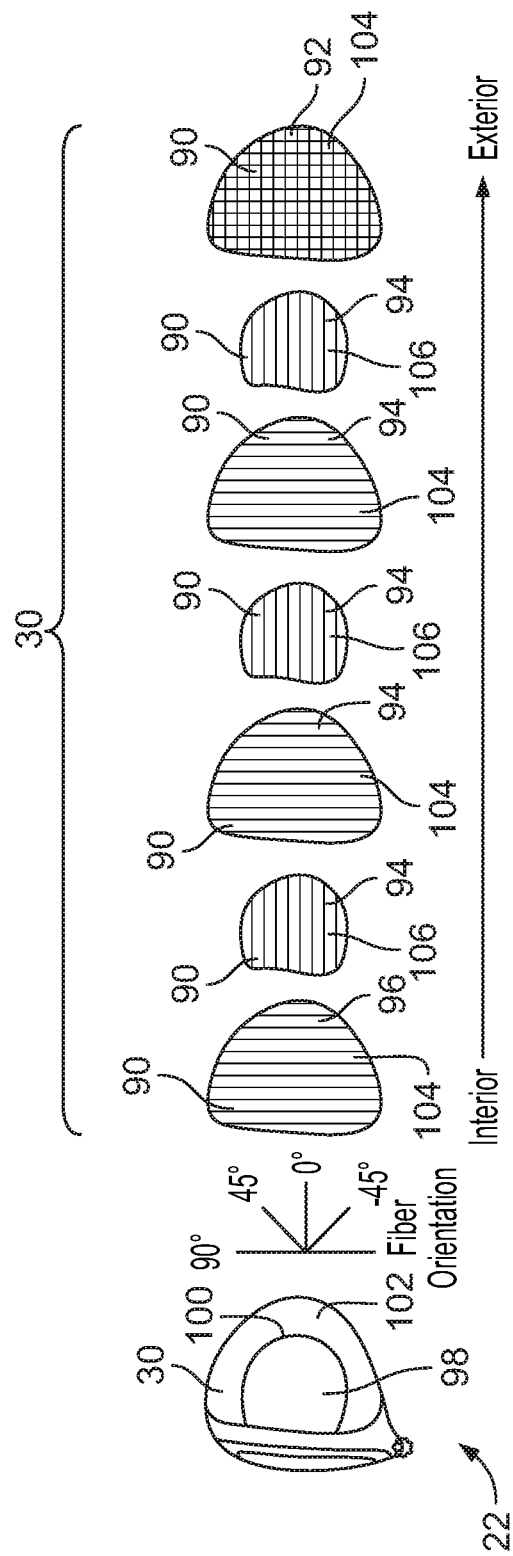
FIG. 21 illustrates a layering sequence of a fourth embodiment of a crownplate implementing varying strength plies.

Now referring to FIG. 21, a fourth layup sequence is shown. The layup sequence of FIG. 21 includes the standard strength plies 104 and the high strength plies 106. All of the high strength plies 106 are also intermediate plies 94. The high strength plies 106 are also the same size as one another, thereby only forming two different thickness regions along the crownplate 30. The exterior ply 92 is a weave ply having fibers at both a 0° and 90° orientation. The intermediate plies 94 alternate between the standard strength plies 104 and the high strength plies 106. The standard strength plies 104 are full plies, while the high strength plies 106 are partial plies, similar to the configuration of thickened plies shown in FIG. 15A. Each of the standard strength plies 104 of FIG. 21 includes a 90° fiber orientation, while each of the high strength plies 106 includes a 0° orientation. The layup sequence of FIG. 21 results in a weight savings of approximately 1.40 g compared to a crownplate 30 that comprises all standard strength plies 104.

Figure 22:
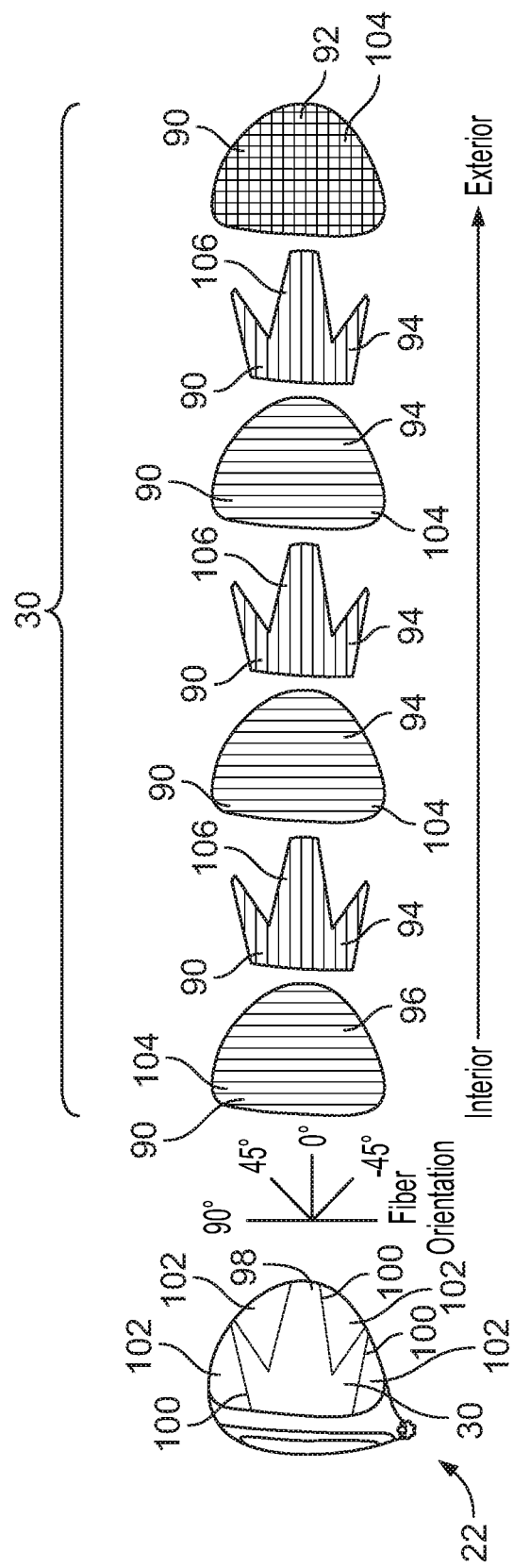
FIG. 22 illustrates a layering sequence of a fifth embodiment of a crownplate implementing varying strength plies.

Referring now to FIG. 22, a fifth layup sequence is shown. The layup sequence of FIG. 22 includes the standard strength plies 104 and the high strength plies 106. All of the high strength plies 106 are also intermediate plies 94. The high strength plies 106 define identical shapes and are the same size as one another, thereby only forming two different thickness regions along the crownplate 30. The exterior ply 92 is a weave ply having fibers at both a 0° and 90° orientation. The plies 90 of FIG. 22 define thickness regions that are similar in profile to the thickness regions of FIG. 17A. The intermediate plies 94 alternate between the standard strength plies 104 and the high strength plies 106. The standard strength plies 104 are full plies, while the high strength plies 106 are partial plies. Each of the standard strength plies 104 of FIG. 2 includes a 90° fiber orientation, while each of the high strength plies 106 includes a 0° orientation. The exterior ply 92 defines both a 90° fiber orientation and a 0° fiber orientation to define a weave. The layup sequence of FIG. 22 results in a weight savings of approximately 1.60 g compared to a crownplate 30 that comprises all standard strength plies 104.

While the various embodiments herein have been described as having a particular weight savings when compared with a crownplate of the same profile having a constant thickness in mm or based on a crownplate that is made from all standard strength plies, it should be appreciated that these particular weight savings may be referred to as a percent weight savings. In some embodiments, the weight savings may be between about 10% weight savings and about 50% weight savings, or between about 15% weight savings and about 45% weight savings, or between about 20% weight savings and about 40% weight savings, or between about 25% weight savings and about 35% weight savings. In some embodiments, the weight savings may be about 10%, or about 15%, or about 20%, or about 25%, or about 30%, or about 35%, or about 40%, or about 45%, or about 50% between a crownplate having varying thickness as described in FIGS. 3A-17B and a crownplate having a constant thickness that is the same thickness as the respective thickest portion of the crownplate having varying thickness.

Any of the embodiments described herein may be modified to include any of the structures or methodologies disclosed in connection with different embodiments. Further, the present disclosure is not limited to golf clubs of the type specifically shown. Still further, aspects of the golf club heads and weighting systems of any of the embodiments disclosed herein may be modified to work with any type of golf club.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the same. The exclusive rights to all modifications which come within the scope of the appended claims are reserved.

We claim:
1. A method of forming a component for a golf club head, the method comprising the steps of:
   providing a first plurality of composite pre-preg plies;
   aligning the first plurality of pre-preg plies within a mold cavity in a first configuration in the shape of the component;

providing a plurality of sacrificial sheets that comprise a non-stick material to define one or both of a first thickness area and a second thickness area;

heating the plurality of composite pre-preg plies to form the component; and removing the sacrificial sheets to form the first configuration of the component, wherein the first configuration comprises the first thickness area and the second thickness area, and wherein the second thickness area is thicker than the first thickness area.

2. The method of claim 1, wherein aligning the first plurality of pre-preg plies includes forming one or more thickness boundaries between the first thickness area and the second thickness area.

3. The method of claim 1, wherein the plurality of sacrificial sheets comprise paper.

4. The method of claim 1, wherein the component is formed by compression molding.

5. The method of claim 1, wherein in the first configuration, the first thickness area narrows from a front region of the component to a rear region of the component.

6. The method of claim 1, wherein the first thickness area defines a thickness of between about 0.40 mm and about 0.70 mm.

7. The method of claim 6, wherein the second thickness area defines a thickness of between about 0.45 mm and about 0.80 mm.

8. The method of claim 7 further comprising a third thickness area that defines a thickness of between about 0.50 mm and about 0.90 mm.

9. The method of claim 8, wherein the first configuration further comprises a fourth thickness area that is thicker than the third thickness area.

10. The method of claim 9, wherein the first configuration further comprises a fifth thickness area that is thicker than the fourth thickness area.

11. The method of claim 1, wherein the composite pre-preg plies comprise between about 0.050% and about 0.100% concentration by weight of graphene.

12. A method of forming a crownplate for a golf club head, the method comprising the steps of:

providing a first plurality of composite pre-preg plies;

aligning the first plurality of pre-preg plies in a first configuration in the shape of the crownplate;

providing a plurality of sacrificial sheets that comprise a non-stick material to define one or more of a first thickness area, a second thickness area, and a third thickness area;

heating the plurality of composite pre-preg plies to form the crownplate; and removing the sacrificial sheets to form the first configuration of the crownplate, wherein the first configuration comprises the first thickness area, the second thickness area, and the third thickness area, and wherein the third thickness area is thicker than the second thickness area, and the second thickness area is thicker than the first thickness area.

13. The method of claim 12, wherein the first thickness area defines a thickness of between about 0.40 mm and about 0.70 mm, wherein the second thickness area defines a thickness of between about 0.45 mm and about 0.80 mm, and wherein the third thickness area defines a thickness of between about 0.50 mm and about 0.90 mm.

14. The method of claim 12, wherein the plurality of sacrificial sheets comprise paper.

15. The method of claim 12, wherein the composite pre-preg plies comprise between about 0.050% and about 0.100% concentration by weight of graphene.

16. The method of claim 12, wherein a second configuration of the crownplate comprises a constant thickness of 0.85 mm, wherein the first configuration defines a crownplate having a weight savings of between about 1.0 g and about 7.0 g compared against the second configuration.

17. The method of claim 16, wherein the first configuration defines a crownplate having a weight savings of between about 2.0 g and about 2.6 g compared against the second configuration.

18. The method of claim 16, wherein the first configuration defines a crownplate having a weight savings of between about 10% and about 40% compared against the second configuration.

* * * * *